US008242410B2

(12) United States Patent
Peters

(10) Patent No.: US 8,242,410 B2
(45) Date of Patent: Aug. 14, 2012

(54) WELDING METHODS AND SYSTEMS

(75) Inventor: Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 307 days.

(21) Appl. No.: 12/775,919

(22) Filed: May 7, 2010

(65) Prior Publication Data
US 2010/0213179 A1    Aug. 26, 2010

Related U.S. Application Data

(63) Continuation-in-part of application No. 11/457,609, filed on Jul. 14, 2006.

(51) Int. Cl.
*B23K 9/09* (2006.01)
*B23K 9/10* (2006.01)

(52) U.S. Cl. ......... 219/130.51; 219/121.63; 219/121.64; 219/125.1; 219/130.1; 219/130.5; 219/137 PS; 706/16; 706/20

(58) Field of Classification Search ............. 219/121.63, 219/121.64, 125.1, 130.5, 130.51, 137 PS; 706/16, 20
See application file for complete search history.

(56) References Cited

U.S. PATENT DOCUMENTS

| | | | |
|---|---|---|---|
| 2,938,107 A | 5/1960 | Pease | |
| 3,342,973 A | 9/1967 | Smith et al. | |
| 3,596,051 A * | 7/1971 | Nomura | 219/137 R |
| 3,627,978 A | 12/1971 | Endo et al. | |
| 3,746,833 A | 7/1973 | Ujiie | |
| 3,832,523 A | 8/1974 | Kitani et al. | |
| 4,246,463 A | 1/1981 | Shutt et al. | |
| 4,420,672 A | 12/1983 | Nolt, Jr. | |
| 4,806,735 A | 2/1989 | Ditschun et al. | |
| 4,897,522 A | 1/1990 | Bilczo et al. | |
| 5,001,326 A | 3/1991 | Stava | |
| 5,155,330 A | 10/1992 | Fratiello et al. | |
| 5,278,390 A | 1/1994 | Blankenship | |
| 5,349,157 A | 9/1994 | Blankenship | |

(Continued)

FOREIGN PATENT DOCUMENTS

CN    201 380 364    1/2010
(Continued)

OTHER PUBLICATIONS

Lincoln Electric, Wave Designer, Arc Works Software Seriea, S2.20, pp. 1-4 May 2000.

(Continued)

*Primary Examiner* — Dao H Nguyen
(74) *Attorney, Agent, or Firm* — Shannon V. McCue; Hahn Loeser & Parks LLP

(57) ABSTRACT

A welding system is provided, in which two electrodes are directed at a joint between two work pieces and the electrodes are energized with DC pulse or AC welding waveforms at a controlled waveform phase angle. The systems include a synchronizing controller to synchronize the welding waveforms, and a work point allocation system provides one or more work point values to the welding machines to provide synergic control of the welding according to a user selected system work point value or parameter. The systems and methods further provide for synchronized work point value modulation for the opposite sides of a dual fillet weld. The system and method further provide a high energy heat source that directs intense heat at a portion of the weld joint to improve weld penetration.

23 Claims, 23 Drawing Sheets

U.S. PATENT DOCUMENTS

| | | |
|---|---|---|
| 5,351,175 A | 9/1994 | Blankenship |
| 5,676,857 A | 10/1997 | Parker |
| 5,715,150 A | 2/1998 | Stava |
| 5,864,116 A | 1/1999 | Baker |
| 6,002,104 A | 12/1999 | Hsu |
| 6,111,216 A | 8/2000 | Stava |
| 6,172,333 B1 | 1/2001 | Stava |
| 6,207,929 B1 | 3/2001 | Stava et al. |
| 6,291,798 B1 | 9/2001 | Stava |
| 6,297,472 B1 | 10/2001 | Bong et al. |
| 6,472,634 B1 | 10/2002 | Houston et al. |
| 6,486,439 B1 | 11/2002 | Spear et al. |
| 6,624,388 B1 | 9/2003 | Blankenship et al. |
| 6,649,870 B1 | 11/2003 | Barton et al. |
| 6,683,279 B1 | 1/2004 | Moerke |
| 6,700,097 B1 | 3/2004 | Hsu et al. |
| 6,717,108 B2 | 4/2004 | Hsu |
| 6,734,394 B2 | 5/2004 | Hsu |
| 6,920,371 B2 | 7/2005 | Hillen et al. |
| 6,940,039 B2 | 9/2005 | Blankenship et al. |
| 6,940,040 B2 * | 9/2005 | Houston et al. .......... 219/130.51 |
| 7,105,773 B2 | 9/2006 | Myers et al. |
| 2001/0000899 A1 * | 5/2001 | Stava et al. ............. 219/137 PS |
| 2004/0035839 A1 * | 2/2004 | Stava et al. .............. 219/130.51 |
| 2006/0037952 A1 * | 2/2006 | Myers et al. ............ 219/130.51 |
| 2006/0207983 A1 * | 9/2006 | Myers et al. ............ 219/137 PS |
| 2006/0237409 A1 | 10/2006 | Uecket et al. |
| 2006/0243704 A1 * | 11/2006 | Matz et al. ...................... 219/74 |
| 2008/0011727 A1 | 1/2008 | Peters |

FOREIGN PATENT DOCUMENTS

| | | |
|---|---|---|
| GB | 282527 | 12/1927 |
| GB | 554687 | 7/1943 |
| GB | 1281420 | 7/1972 |
| JP | 2001-252768 | 9/2001 |
| JP | 2003 154457 | 5/2003 |
| JP | 2004 009061 | 1/2004 |

OTHER PUBLICATIONS

Lincoln Electric, Power Feed 10 Wire Drive & Control Box, Boom Mount or Bench Model, IM584-D, Oct. 2003.

Lincoln Electric, Power MIG 350MP, Publication E7.57, pp. 1-8, Dec. 2004.

Lincoln Electric, Power Feed 10M, Publication E8.266, pp, 1-8, Aug. 2004.

Lincoln Electric, LF-72 and LF-74 Wire Feeders, Publication E8.11, pp. 1-8, Apr. 2005.

International Search Report, PCT/US2007/063847, Mar. 13, 2007, Lincoln Global, Inc.

Lincoln Electric, Automatic Welding Systems with Solid State Controls, Underwrites Laboratories Listed.

Lincoln Electric, Power Wave 455M & Power Wave 455M.STT.

Form PCT/ISA/237 Written Opinion dated Sep. 26, 2011.

Form PCT/ISA/221 International Search Report dated Sep. 26, 2011.

* cited by examiner

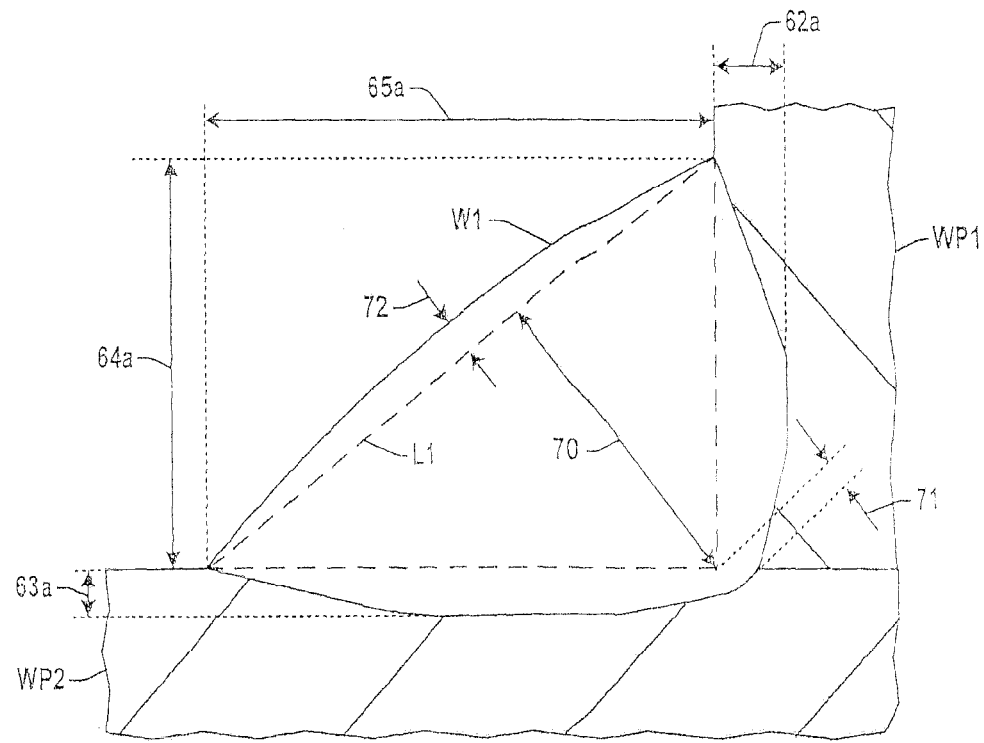
FIG. 6
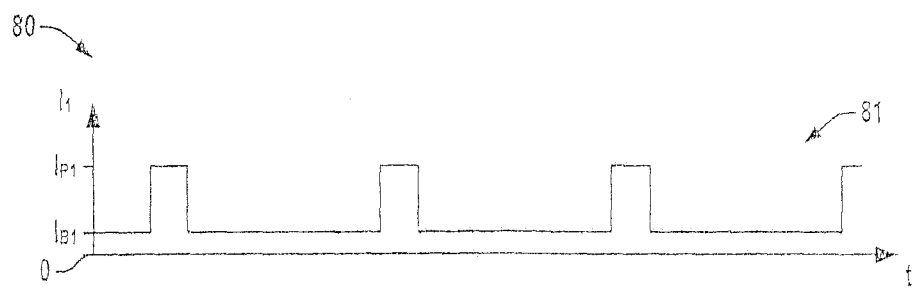
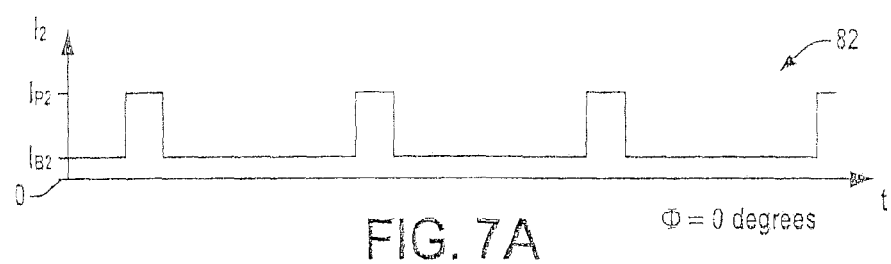
FIG. 7A    Φ = 0 degrees

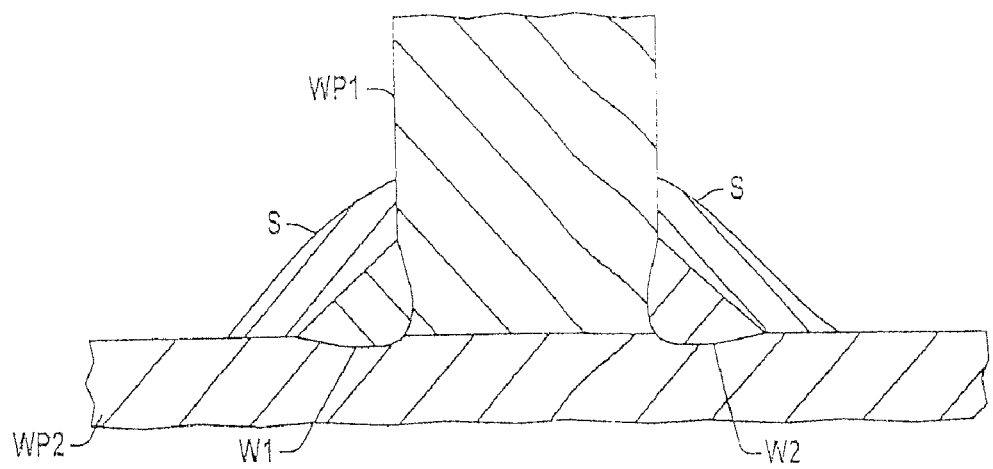
FIG. 12
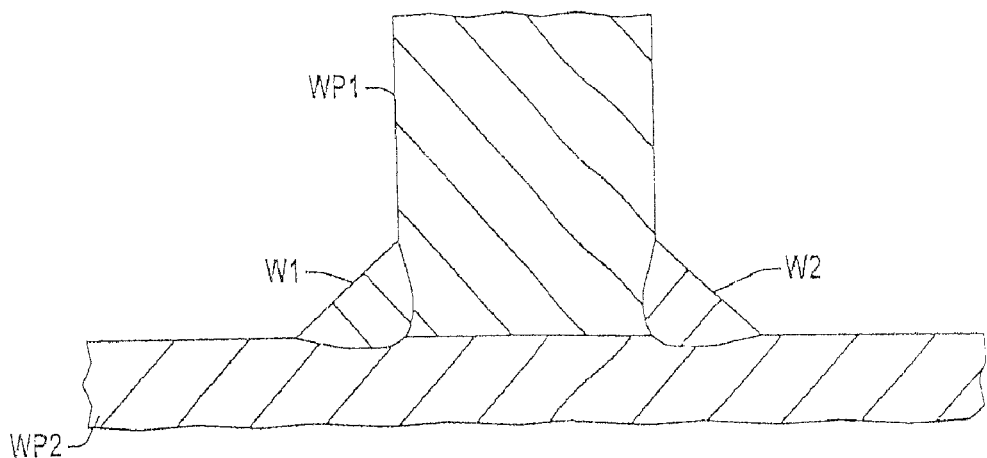
FIG. 13
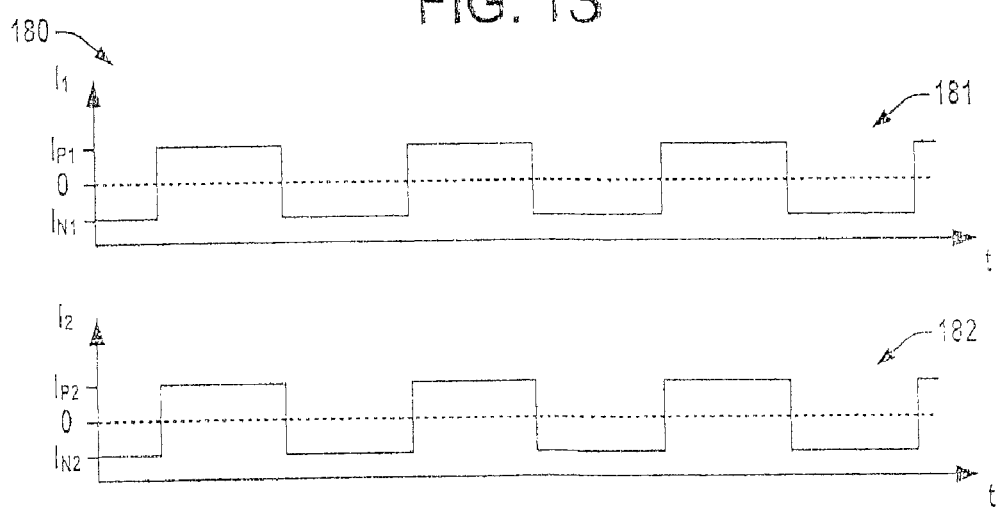
FIG. 14A   Φ = 0 degrees

WELDING METHODS AND SYSTEMS

CROSS REFERENCE TO RELATED APPLICATIONS

This U.S. patent application is a continuation-in-part (CIP) application of U.S. patent application Ser. No. 11/457,609 filed on Jul. 14, 2006, of which is hereby incorporated herein by reference.

TECHNICAL FIELD OF THE INVENTION

The present invention relates generally to arc welding, and more particularly to methods and systems for creating welds using synchronized welding waveforms and modulated work points.

BACKGROUND OF THE INVENTION

In welding fabrications, the "T" connection or T-joint is one of the most common welded connections used to join two pieces of metal together, in which a first piece of metal such as a stiffener work piece forms the leg of the T and the second work piece is the top of the T. Often, both corners of the T connection are welded with fillet welds, wherein these weld joints are referred to as "dual fillet" welds. In some applications, the joint is long and straight and the welding can be mechanized with a pair of welding torches fixed on a common framework facing both corners of the T connection and both welds are performed concurrently to reduce fabrication time. A common example of dual fillet welding is in the fabrication of girders, in which stiffeners are attached to the web of a girder with two long straight fillet welds. Other examples include T connections on round fabrications, such as connection of stiffeners to a tube or pipe, wherein the tube is rotated and a mechanized welding fixture makes both welds at the corners of the T at the same time. Yet another example of this technology uses a tube as the top of the T and a plate as the leg of the T. In all of these examples, both fillet welds at the corners of a T connection are welded at the same time. Depending on the application, fabricators can use many various arc welding processes including SAW, FCAW-S, FCAW-G, MCAW, or GMAW. With all of the processes listed, the welding procedure (e.g. amps, volts, travel speed, etc.) is closely controlled to achieve the desired weld bead and penetration level. Due to the concurrent welding, however, the high heat and magnetic field from the arc on one side of the joint will often adversely affect the arc and weld puddle on the other side. Typically fabricators are forced to reduce welding procedures to overcome the problems associated with two arcs operating on either side of a T connection. Thus there is a need for improved welding systems and techniques by which high quality welds can be deposited on both sides of a T connection simultaneously.

Other concurrent welding techniques exhibit the same difficulties with respect to the effect of using multiple arcs where one arc adversely affects the other arc. For example, where the work piece is grounded along a common axis, as in a tank welding application, the use of two arcs welding the ends of the tank concurrently often exhibit the same adverse affects. Another example is when two arcs are operating in the same weld puddle along a common line. Again, operating the arcs simultaneously often leads to adverse affects.

As a related issue, in welding such joints, it is difficult to obtain good penetration of the weld. Often, adequate penetration may be achieved but requires multiple passes making the weld somewhat inefficient in terms of the amount of material used and the time and energy necessary to achieve suitable penetration. Therefore, there is a need for improved welding system and technique to achieve better penetration in a T connection or other similar joints.

SUMMARY OF THE INVENTION

The invention is related to dual fillet welding and improved methods and apparatus therefor. The following is a summary of one or more aspects of the invention to facilitate a basic understanding thereof, where the summary provided below is not an extensive overview of the invention, and is neither intended to identify certain elements of the invention, nor to delineate the scope of the invention. Rather, the primary purpose of the summary is to present some concepts of the invention in a simplified form prior to the more detailed description that is presented hereinafter. Improved welding systems and methods are provided in which first and second welds are created with synchronized waveforms and/or work points to facilitate uniform controllable weld penetration, shape, and size, where the advances presented herein may facilitate creation of consistent high quality welds. In accordance with another aspect of the present invention, a laser is used in conjunction with synchronized electrodes in a welding system to direct a laser beam at a portion of a work piece near the electrodes to heat the portion of the work piece near the weld and improve penetration of weld.

These and other objects of this invention will be evident when viewed in light of the drawings, detailed description and appended claims.

BRIEF DESCRIPTION OF THE DRAWINGS

The following description and drawings set forth certain illustrative implementations of the invention in detail, which are indicative of several exemplary ways in which the principles of the invention may be carried out. Other objects, advantages and novel features of the invention will become apparent from the following detailed description of the invention when considered in conjunction with the drawings, in which:

FIG. 6 is an enlarged sectional elevation view showing further details of an exemplary fillet weld created using the system of FIGS. 1A and 1B;

FIG. 7A is a graph showing exemplary plots of first and second synchronized DC pulse welding current waveforms provided by the power sources in the system of FIGS. 1A and 1B for substantially in-phase side-to-side welding waveforms with about zero degree waveform phase angle;

FIG. 12 is a partial end elevation view in section taken along line 12-12 of FIG. 10 illustrating a cooled dual fillet weld with solidified slag overlying the welds;

FIG. 13 is a sectional end elevation view showing the dual fillet submerged arc weld following slag removal;

FIG. 14A is a plot showing graphs of substantially in-phase first and second AC welding waveforms provided by the power sources in the submerged arc dual fillet welding operation of FIGS. 10-12;

DETAILED DESCRIPTION OF THE INVENTION

Figure 1A:
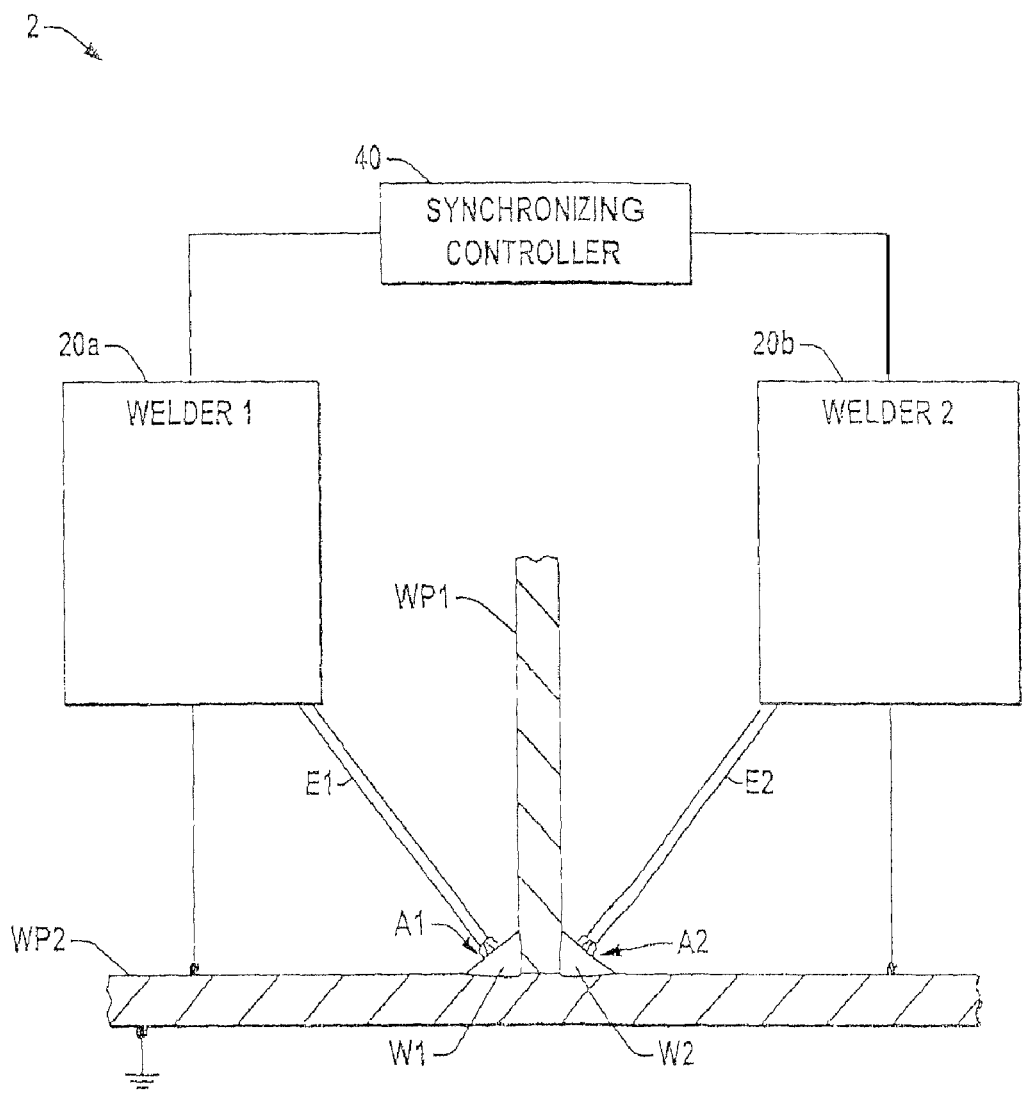
FIG. 1A is a simplified system diagram showing an exemplary welding system with synchronized welding machines for creating a dual fillet weld according to one or more aspects of the present invention.

Referring now to the figures, several embodiments or implementations of the present invention are hereinafter described in conjunction with the drawings, wherein like reference numerals are used to refer to like elements throughout and wherein the illustrated structures are not necessarily drawn to scale. Although several preferred embodiments are illustrated and described hereinafter in the context of root pass dual fillet welding using two welding electrodes positioned on opposite sides of a welded work piece, other embodiments are possible in which two or more pairs of opposing welding electrodes are used in creating a dual fillet weld with one or more passes, with the waveforms applied to the electrodes and/or the work points used by opposing welding machines of a given pair being operated in a synchronized manner to provide controlled waveform and/or work point phase angles during concurrent creation of two fillet welds. Further embodiments are also contemplated in which several passes can be used to form a dual fillet weld, with the welding signal waveforms and/or work point waveforms being temporally synchronized such that the signals used in forming the welds on either side of the T-joint are provided at a controllable phase relationship to one another. Other embodiments or implementations of the present invention include forming welds with multiple electrodes in a common puddle or simultaneously welding multiple points when there is a common ground axis. An example of a multiple electrode implementation of the present invention is providing first and second electrodes forming a butt weld where a first electrode lays a first pass of weld material with the second electrode closely behind the first electrode laying a second pass of weld material on top of the first pass. Ordinarily to perform this procedure, the electrodes must be widely spaced to prevent them from interfering with each other. The welding system of the present invention avoids this by synchronizing the welding signal wave forms and/or work point wave forms to prevent the electrodes from interfering with each other when operating in the same weld puddle. This allows the electrodes to be placed in closer proximity to each other. An example of a common ground axis weld would be a tank weld where the work piece is the body of the tank and the ends are attached by welds at the same time. The common ground axis generally corresponds to the center axis of the tank body. Previously, the ends would need to be welded separately because simultaneous welding with multiple electrodes attaching the respective ends would interfere with each other because of the shared ground axis. According to the concepts of the present invention, a welding system may be provided with two or more electrodes that are used to attach the ends of the tank simultaneously. To prevent interference between electrodes sharing a common ground axis, the welding system synchronizes welding signal wave forms and/or work point wave forms such that the signals used to form the welds on either side of the tank are provided at a controllable phase relationship to each other. In essence, the welding system controls the phase relationship by allowing one electrode to be in an off state while the other electrode is in an on state such that the arcs from the electrodes do not interfere with each other. In this regard, the specific embodiments illustrated and described hereinafter are not intended as limitations, but rather as examples of one or more possible preferred implementations of the various aspects of the invention.

Figure 1B:
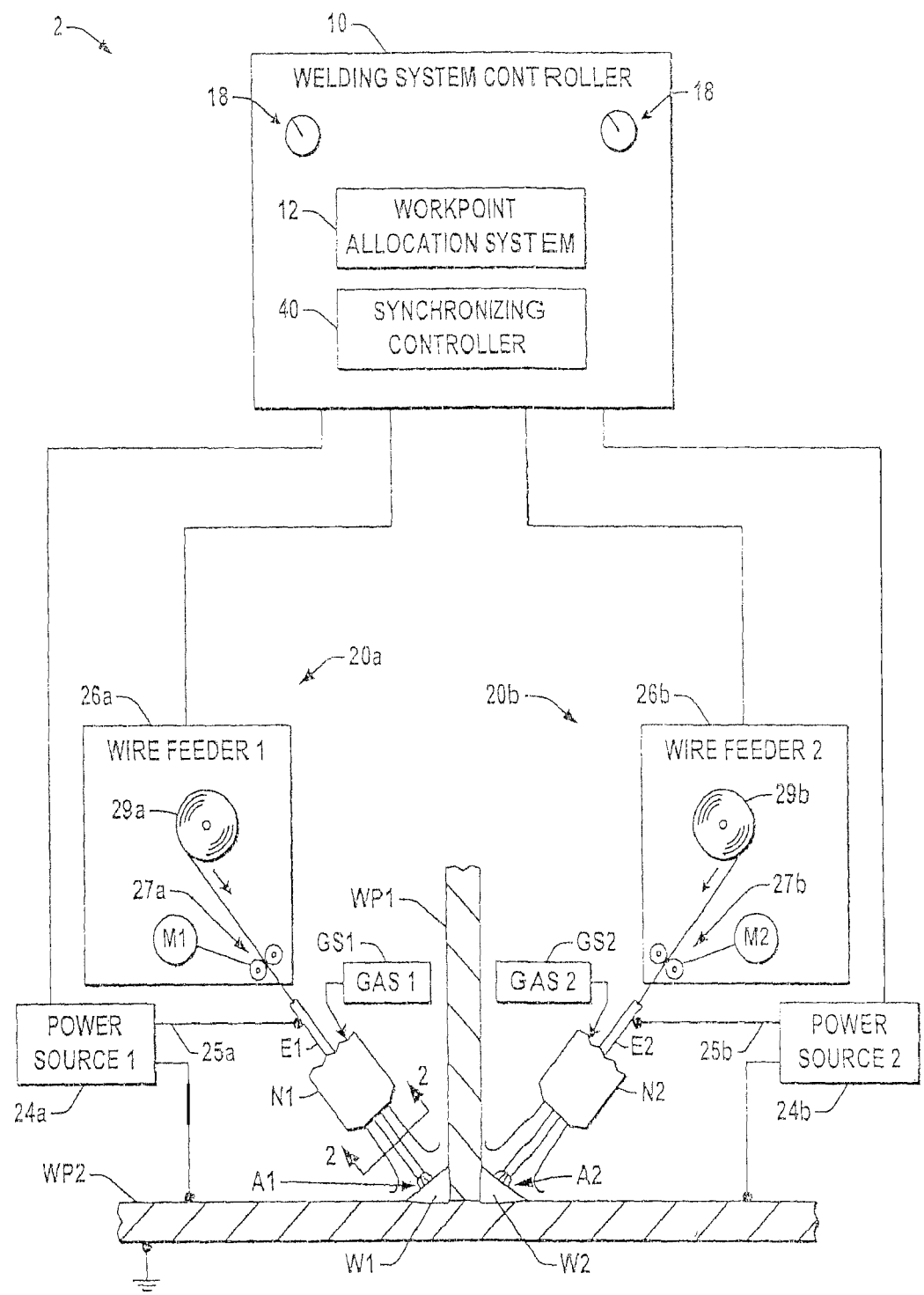
FIG. 1B is a detailed system diagram illustrating further details of the welding system of FIG. 1A in accordance with one or more aspects of the invention.

FIGS. 1A and 1B show an exemplary dual fillet welding apparatus or system 2 including first and second welding machines 20a and 20b with a synchronizing controller 40 providing for control of the phase relationship of either or both of the welding current waveforms and/or one or more machine work points in creating dual fillet welds W1 and W2 using electrodes E1 and E2 and welding arcs A1 and A2, respectively to weld a first work piece WP1 to a second work piece WP2. As shown in FIG. 1B, the synchronizing controller may be provided in a welding system controller 10 for performing a DC pulse dual fillet welding process using flux cored welding electrodes E1 and E2, an AC submerged arc welding (SAW) process using solid welding electrodes E1 and E2 or other suitable dual fillet welding process using solid or cored electrodes with or without external shielding gas GS1, GS2. The selected welding process is performed to create the first and second fillet welds W1 and W2, respectively, on opposite sides of a T-joint formed by an end of the first work piece WP1, such as a stiffener, and a flat surface of the second work piece WP2, where the work pieces WP and the resulting T-joint may be flat, but can also be curved.

The welding machines 20 in the exemplary system 2 are generally similar to one another, although different machines may be used in other implementations. The first machine 20a includes a power source 24a having an output terminal 25a coupled to provide a waveform controlled welding signal (welding voltage, current) to the corresponding electrode E1 in order to create the first dual fillet weld W1. As illustrated and described further below with respect to FIG. 9, the exemplary power source 24a is a switching type source including an output stage that provides a welding signal according to one or more pulse width modulated switching signals created by a waveform generator that controls a pulse width modulator in the power source 24a, where the exemplary sources 24 of system 2 are generally of the type shown in Blankenship U.S. Pat. No. 5,278,390 and Hsu U.S. Pat. No. 6,002,104 incorporated by reference above and as sold by the Lincoln Electric Company under the trademark POWER WAVE. The machine 20a further includes a motorized wire feeder 26a operable to feed or direct the electrode E1 toward a first side of the weld joint at a controlled wire feed speed via a motor M1 driving one or more drive rolls 27a, whereby electrode wire E1 is delivered from a spool or other supply 29a to the weld W1. The second machine 20b is similarly configured, including a second power source 24b having an output stage with an output terminal 25b that is coupled to a second welding electrode E2 and provides a second welding current signal thereto with a second waveform generated by a waveform generator controlling a pulse width modulator circuit to determine the current operation of the output stage. The second machine 20b also includes a wire feeder 26b with a motor M2 driving rolls 27b to direct the electrode E2 from a supply reel 29b toward a second side of the weld joint at a second wire feed speed.

Figure 2A:
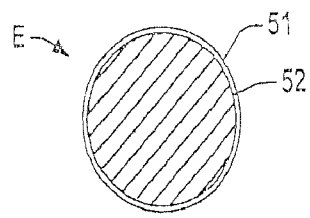
FIG. 2A is sectional end view taken along line 2-2 in FIG. 1B illustrating an exemplary solid electrode that may be used for dual fillet welding with the system of FIGS. 1A and 1B.
Figure 2B:
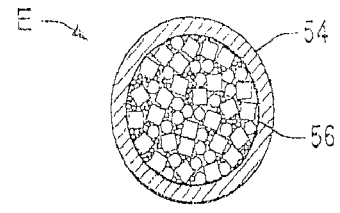
FIG. 2B is another sectional view taken along line 2-2 in FIG. 1B illustrating an exemplary cored electrode that may be used in the system of FIG. 1B for dual fillet welding.
Figure 3:
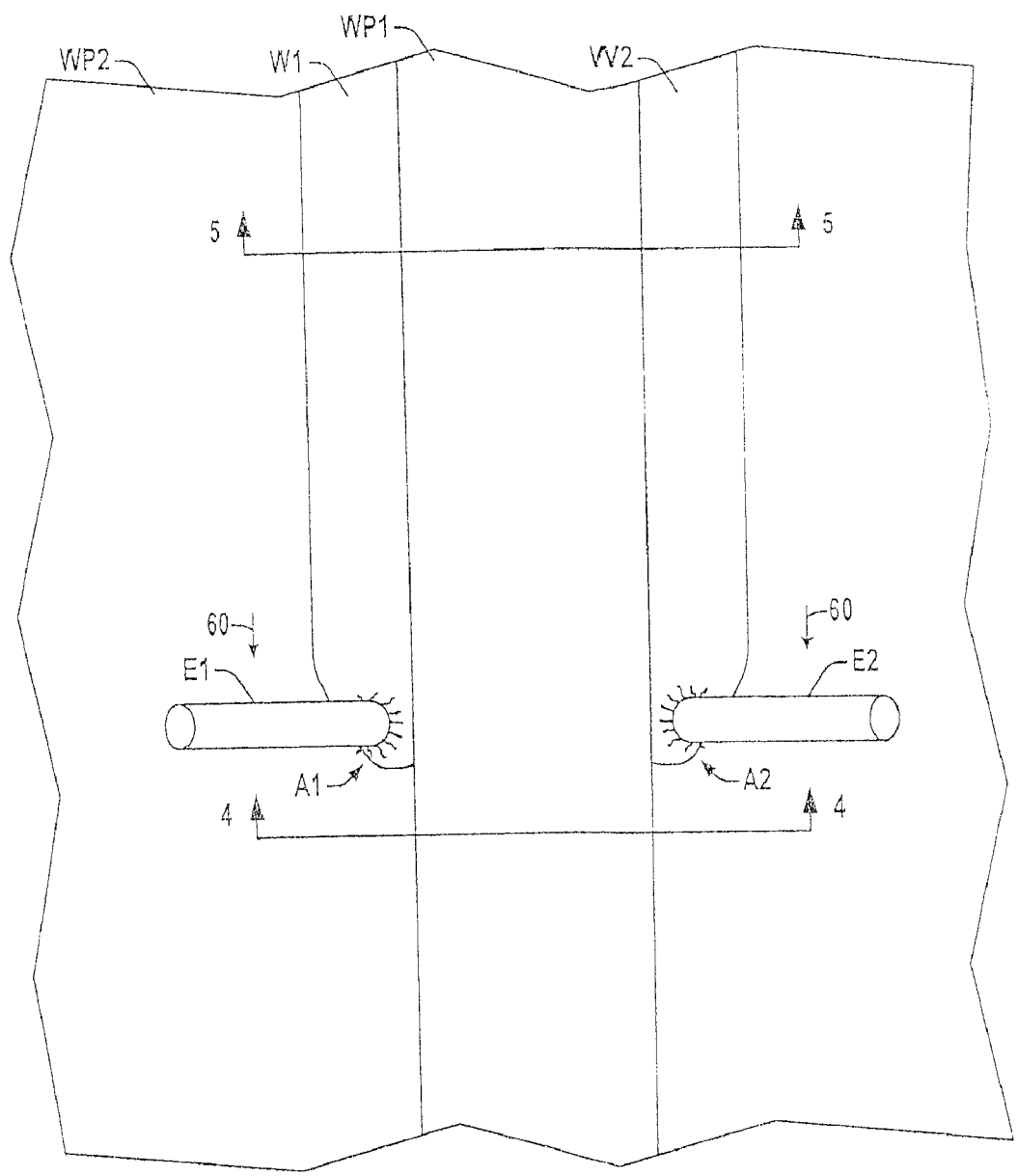
FIG. 3 is a partial top plan view showing an exemplary dual fillet welding process using the system of FIGS. 1A and 16.

The power source output terminals 25a and 25b are electrically coupled, directly or indirectly, to the respective welding electrodes E1 and E2 using any suitable electrical contact or interconnection structures, wherein these connections are shown schematically in FIG. 1 for ease of illustration. The welding electrode wires E are fed from the supply spools 29 through first and second welding torch nozzles N1 and N2, wherein external shielding gas may be provided to the fillet welds through suitable ports and passageways within nozzles N from gas supplies GS1 and GS2, respectively, although other embodiments are possible in which no shielding gas is used. Referring also to FIGS. 2A and 28, any type of welding electrodes E may be used, for example, solid electrodes (FIG. 2A) comprising a solid electrode material 52 with or without an optional outer coating 51. Another suitable electrode E is shown in FIG. 2B, in this case a cored type electrode E having a metallic outer sheath 54 surrounding an inner core 56, where the core 56 includes granular and/or powder flux material for providing a shielding gas and protective slag to protect a molten weld pool during the dual fillet welding, as well as alloying materials to set the material composition of the fillet weld material. The dual fillet weld processing shown in FIGS. 1A, 1B, and 8 is used to weld the stiffener work piece WP1 to the flat upper surface of the second work piece WP2, wherein two welding arcs A1 and A2 are provided by the first and second machines 20a and 20b, respectively, on opposite sides of the stiffener work piece WP1

Figure 8:
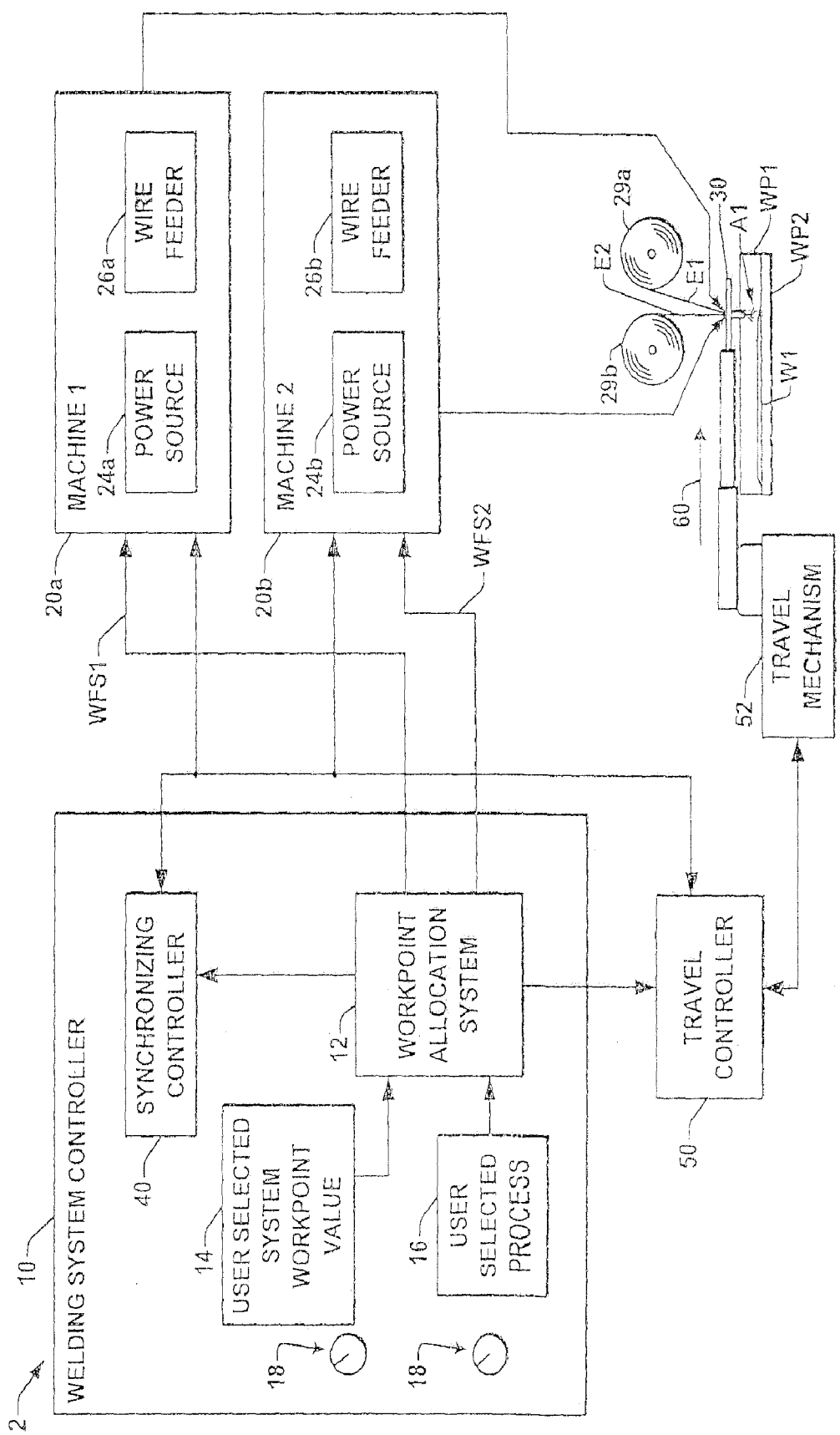
FIG. 8 is a system level schematic diagram illustrating further details of the welding system of FIGS. 1A and 1B, with the welding machines and a travel controller being synchronized and controllable in synergic fashion according to a user selected process and a system work point, wherein with the welding torches are controllably movable by a travel mechanism relative to stationary work pieces.
Figure 8A:
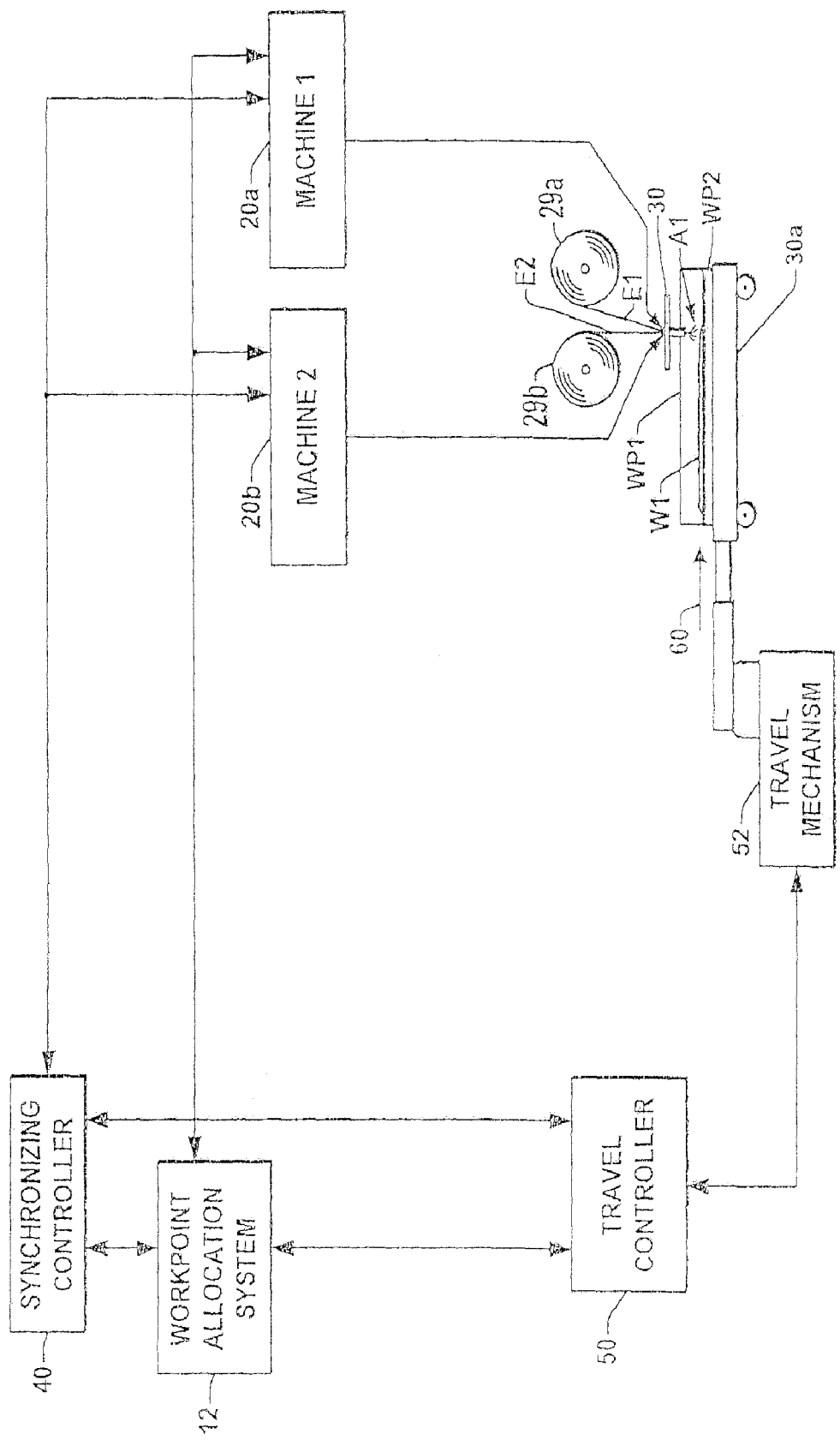
FIG. 8A is a system level schematic diagram illustrating an alternate travel mechanism configuration with the work pieces being movable relative to stationary welding torches.

As best shown in FIGS. 8 and 8A, the two fillet welds are performed concurrently from both sides to join the work pieces WP1 and WP2 as a travel mechanism 52 moves a weld fixture 30 in a horizontal direction 60 (FIG. 8) or alternatively moves the work pieces WP1, WP2 on a carriage 30a relative to fixed welding torches (FIG. 8A). The welding process may be tailored to create first and second welds W1 and W2 of the same or similar weld size (e.g., leg size), although the methods and systems of the invention may be used in creating dual fillet welds with different first and second weld sizes, shapes, profiles, etc.

In the example of FIGS. 1A and 1B, the machines 20 are operatively coupled with the synchronizing controller 40 and a work piece allocation system 12 of the system controller 10 for exchanging data and control signals, messages, data, etc. therewith. In one embodiment, a stand-alone welding system controller 10 includes the synchronizing controller 40 operatively coupled with the power sources 24a and 24b and provides power sources 24 with synchronization information (e.g., signals, messages, etc.) to synchronize the first and second waveform generators thereof such that the first and second welding currents are at a controlled phase angle with respect to one another. The wire feeders 26 may also be synchronized by or according to suitable information (data, signaling, etc.) from synchronizing controller 40 and/or directly from the respective power sources 24 or other intermediate components in order to coordinate the provision of welding wire to the dual fillet welding process according to the current welding waveforms and other process conditions at a particular point in time. Similarly, the shielding gas supplies GS1, GS2 may be controlled in synchronized fashion using control apparatus of the machines 20 according to synchronization information from the synchronizing controller 40. The exemplary system controller 10, moreover, includes the work point allocation system 12 operatively coupled with the welding machines 20a and 20b, which receives a user selected system setpoint or work point value and provides individual machine work point values to the machines 20 to set a total output of the dual fillet welding system 2. Such synergic control may be provided to allow a user to simply set one system work point value, for example, a deposition rate, weld size, wire feed speed, welding current, welding voltage, a travel speed, etc., with the machines 20 and/or components thereof being provided with local work points to achieve the desired system-wide performance. Moreover, the allocation system 12 or the synchronizing controller 40 or other system components may provide for modulation of one or more machine work points according to work point waveforms to provide a controlled machine work point phase angle between the work point waveforms as described further hereinafter. In other embodiments, one or both of the synchronizing controller 40 and the work point allocation system 12 may be separately housed, or may be integrated in one or more system components, such as the welding machines 20 or the power sources 24 thereof, for example.

Figure 4:
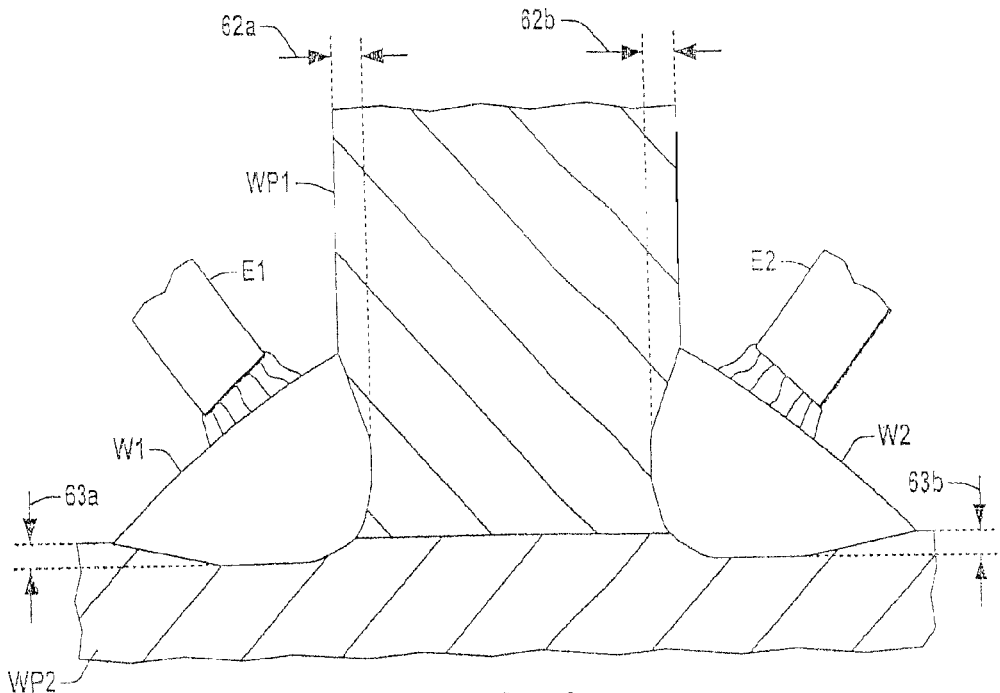
FIG. 4 is a partial end elevation view in section taken along line 4-4 of FIG. 3 illustrating molten weld material during formation of the dual fillet weld.
Figure 5:
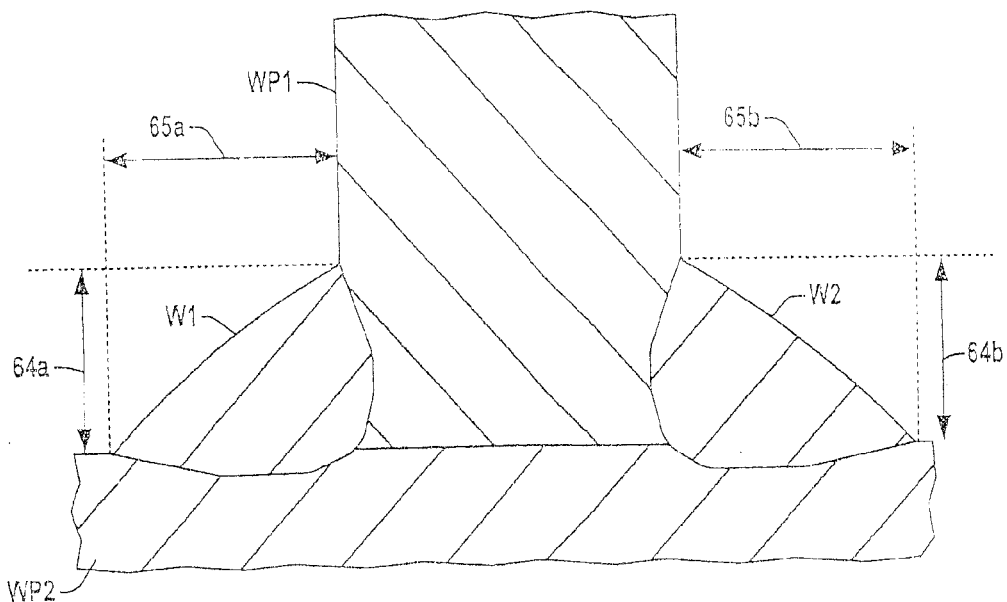
FIG. 5 is a partial end elevation view in section taken along line 5-5 of FIG. 3 illustrating a cooled dual fillet weld.

Referring also to FIGS. 3-6, 15A, and 15B, in creating the dual fillet weld at the T-joint of the work pieces WP1 and WP2, it is desirable that the size and uniformity of the dual fillet weld, the amount of penetration, and the shape (concave, convex, etc.) are controllable, repeatable and uniform along the length of the weld so as to enhance the quality of the resulting joined structure. In addition, the relative amount of similarity between the welds on opposite sides of the dual fillet weld may affect the quality of the T-joint weldment, wherein inconsistent penetration and/or differences in the amount of weld penetration on the two sides may lead to inferior joint strength, cracking, or other quality problems. Furthermore, the synchronization of the concurrent weld processes may facilitate the ability to economize the amount of welding time and filler material used. As shown in FIGS. 3-6, the dual fillet process is performed with the electrodes E1 and E2 moving in the direction 60 relative to the work pieces WP1 and WP2, and with electrodes E1 and E2 being fed at controlled wire feed speeds towards opposite first and second sides of the stiffener work piece WP1, respectively. Providing synchronized waveform controlled welding currents $I_1$ and $I_2$ to the electrodes E1 and E2 creates and maintains welding arcs A1 and A2 between the electrodes E1 and E2, respectively, and the work pieces WP1 and WP2 or a weld pool thereon. The welding arcs A1 and A2, in turn, cause deposition of molten electrode material and possibly melting of certain amounts the work piece materials to form molten welds W1 and W2 as shown in FIG. 4 as the electrodes E pass a given location along the weld direction 60. The weld materials W1, W2 eventually cool and solidify as best shown in FIG. 5, leaving the finished dual fillet weld (or a finished single pass of a multiple pass dual fillet weld). As best shown in FIG. 4, the localized heating of the work pieces WP1 and WP2 during the welding process may cause the molten weld material to laterally penetrate the stiffener WP1 by first and second lateral penetration distances 62a and 62b, where the lateral penetration distances 62 may, but need not, be the same. The welds W1 and/or W2 may also penetrate vertically downward into the flat upper surface of the second work piece WP2 by distances 63a and 63b, respectively, which distances may, but need not, be the same for a given welding process.

Figure 15A:
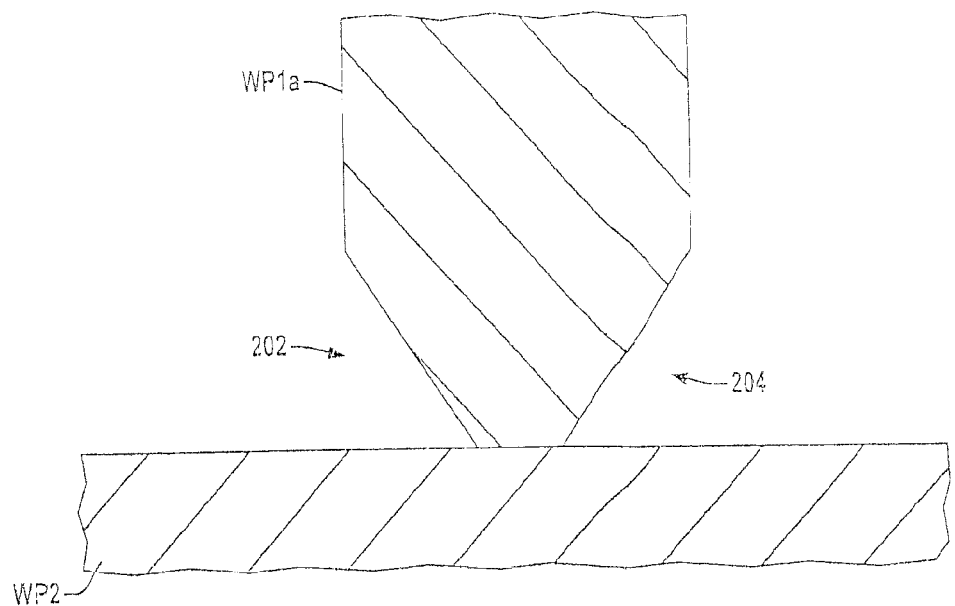
FIG. 15A is a partial end elevation view in section illustrating an exemplary beveled stiffener first work piece used in forming a dual fillet welded T-joint.
Figure 15B:
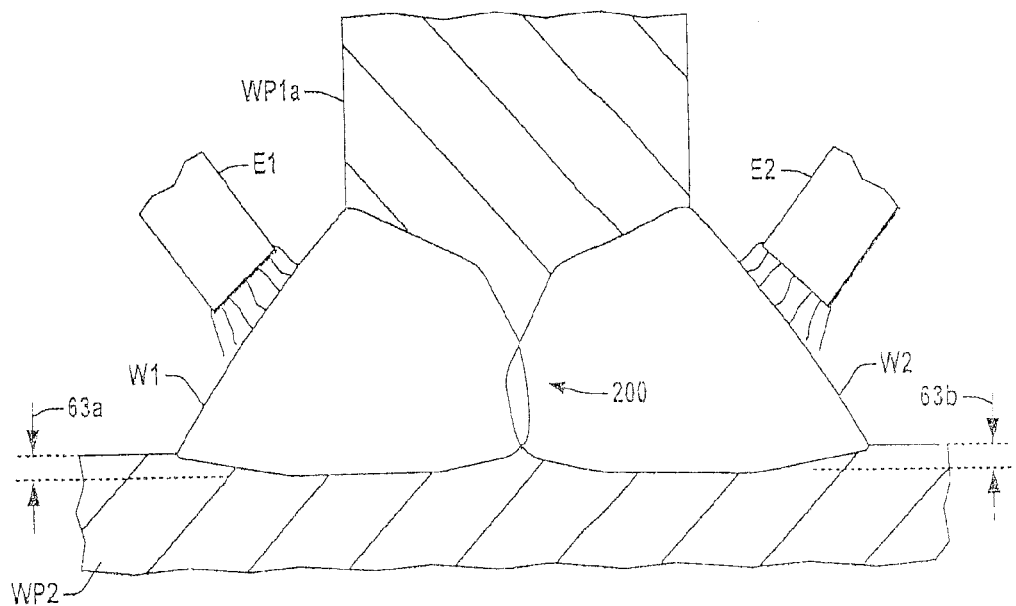
FIG. 15B is a partial end elevation view of the work pieces of FIG. 15A following dual fillet welding to create a complete penetration dual fillet weld joint using the synchronized welding methods and systems of the invention.

As shown in FIG. 5, moreover, the finished fillet welds W1 and W2 will have certain profiles or shapes, wherein the exposed outer weld surfaces may be convex as shown in the illustrated example, or may alternatively may have generally flat, or concave, or curvilinear surface shapes or fillet face contours. The weld sizes may be characterized by the vertical leg dimensions 64a and 64b as well as by lateral or horizontal leg dimensions 65a and 65b, wherein the vertical and lateral leg dimensions may, but need not be the same for a given fillet weld, and wherein these size dimensions may, but need not be the same for the first and second welds W1 and W2. Referring also to FIG. 6, an enlarged illustration of the first fillet weld W1 is shown. The finished weld W1 has vertical and lateral leg dimensions 64a and 65a, respectively, which together define a theoretical throat dimension 70 extending from the original corner at the edge of the original first work piece WP1 and the surface of the original second work piece WP2 to a line L1 between the corner edges of the weld W1, where the effective weld throat distance is the theoretical throat dimension 70 plus a throat penetration distance 71. In the illustrated convex example, moreover, the degree of convexity can be quantized as a dimension 72 extending from the theoretical line 71 to the outermost extension of the exposed face or surface of the weld W1. Referring also briefly to FIGS. 15A and 15B, the vertical first work piece WP1 may have beveled surfaces 202, 204 at the end facing the second work piece WP2. Furthermore, as shown in FIG. 15B, the welds W1 and W2 may join at a central location 200, thereby providing for a complete penetration weld joint.

Referring also to FIGS. 7A-7G, 8, and 8A, the inventors have appreciated that synchronized control of the welding current waveforms and/or of welding machine work point values may facilitate control over the consistency of the above mentioned dimensional and performance characteristics of the first and second welds W1 and W2 in dual fillet welding where the two sides of the T-joint are welded concurrently. In this regard, the coordination of the applied welding signal waveforms of the first and second power sources 24a and 24b at a controlled waveform phase angle may be advantageously employed to ensure that the degree of penetration of the two opposing welds W1 and W2 are substantially the same on both sides of the first work piece WP1 in cases where it is desired to have first and second welds of identical dimensions, including the relative similarities with respect to vertical penetrations 63, lateral penetrations 62, and the corner penetration 72 as shown in FIGS. 4 and 6. In addition, providing the first and second welding current waveforms at a controlled phase angle is believed to contribute to controllability of these dimensions in situations where the first and second welds are designed to be different. Alternatively or in combination, controlled modulation of one or more machine work point values such as power source output level, waveform frequency, wire feed speed, etc., at a controllable relative machine work point phase angle can be employed for enhanced dual fillet welding.

While not wishing to be tied to any particular theory, it is believed that simultaneous welding from both sides of work piece WP1 without temporal coordination of the welding parameters of the two processes, even for otherwise identical welding parameter settings, can cause asymmetrical penetration, and lack of consistency in the penetration depths, weld shapes, etc., along the direction of electrode travel, due to electromagnetic interaction of the material with fields created by the currents flowing through the electrodes E and the resulting arcs A as well as thermal affects of unsynchronized concurrent welding processes on either side of the weld joint. These asymmetries and/or inconsistencies, in turn, may lead to suboptimal weld joint characteristics and/or performance, including susceptibility to cracking and/or corrosion, reduced joint strength, etc. Furthermore, controllable penetration consistency in the two welds may also facilitate reduction in weld time (increased weld speed) and optimization of the amount of filler material used in dual fillet welding. In this regard, controlled, consistent penetration of the two fillet welds W1 and W2 beyond the root may allow smaller leg size dimensions for a given weld strength specification, by which increased weld travel speeds and/or reduced quantities of filler metal (electrode utilization) may be achieved to reduce welding costs.

FIG. 7A illustrates a graph showing exemplary plots 81 and 82 of first and second synchronized DC pulse welding current waveforms, respectively, provided by the power sources 24 in the system of FIGS. 1A and 1B for substantially in-phase side-to-side welding waveforms with about zero degree waveform phase angle $\Phi$. As shown in the plot 80, the exemplary welding system 2 is operable to provide synchronized first and second welding waveforms 81 and 82 via the power sources 24a and 24b, respectively, wherein the waveform synchronization can be by any suitable means in the system 2, such as the synchronizing controller 40 or other system component, whether hardware, software, or combinations thereof. In one preferred embodiment, the system 2 is employed in performing a dual fillet DC pulse welding process using flux cored electrodes E1 and E2, as exemplified in FIGS. 1A, 1B, 2B, and 3-6, wherein the temporally aligned DC pulse waveforms 81 and 82 of FIG. 7A may be provided to perform the dual fillet welding. As shown in the plot 80 of FIG. 7A, moreover, the DC pulse waveforms 81 and 82 are substantially in-phase with zero waveform phase angle $\Phi$, so as to facilitate control over the consistency and symmetry of the weld penetration. In this implementation, both the DC pulse welding waveforms 81, 82 are comprised of a series of pulses including a background current level $I_B$ and a higher pulse current level $I_P$, with the pulses of the first and second welding currents $I_1$ and $I_2$ being substantially in phase, such as within about 10 electrical degrees of one another, wherein the relative waveform phase angle $\Phi$ in this case is about zero, such as about 10 degrees or less. In the illustrated example, moreover, the first and second waveforms 81 and 82 are substantially identical, although not a requirement of the invention. In this regard, one possible application of this type of implementation is where the first and second welds W1 and W2 are desired to be the same size, with equal or similar weld leg dimensions 64 and 65 on both sides of the stiffener work piece WP1.

Figure 7B:
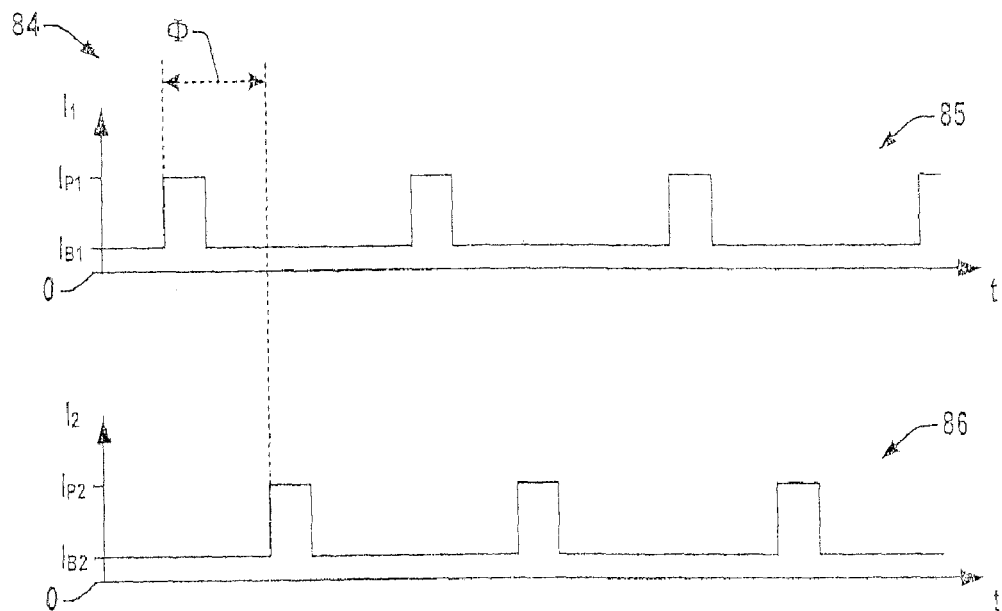
FIG. 7B is a graph showing exemplary DC pulse welding current waveforms with a controlled non-zero degree waveform phase angle.
Figure 7C:
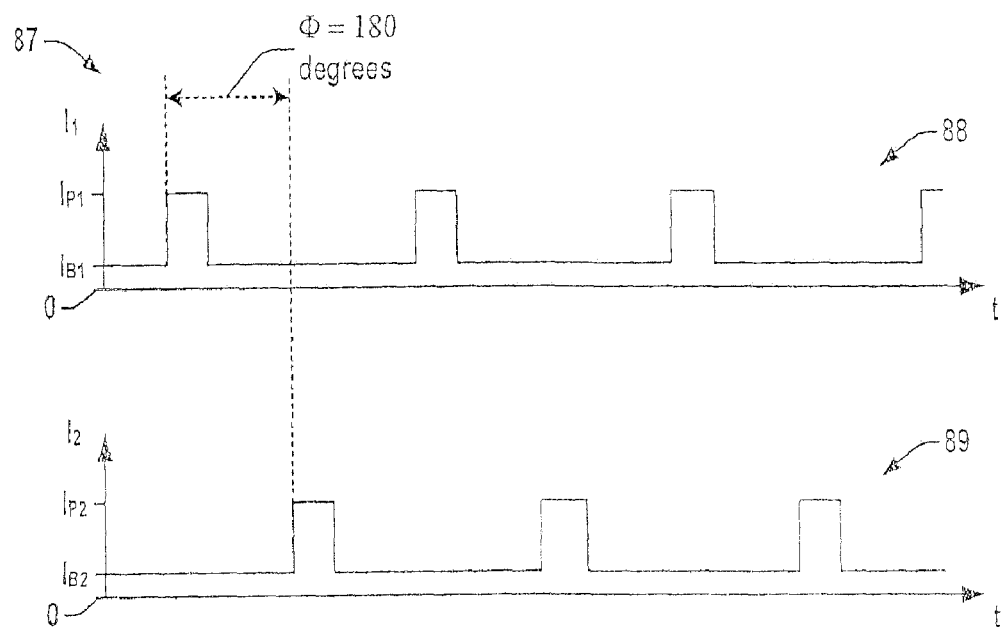
FIG. 7C is a graph showing exemplary plots of synchronized DC pulse current waveforms in the system of FIGS. 1A and 1B for substantially out-of-phase welding waveforms with about 180 degree waveform phase angle.

While the current waveforms are illustrated in the DC pulse welding examples of FIGS. 7A-7C as having less than a 50% duty cycle (the ratio of the pulse current time divided by the background current time), the waveforms may be of any suitable duty cycle to implement a given dual fillet welding procedure. Furthermore, the implementation shown in FIG. 7A provides for substantially equal pulse current values $I_{P1}$ and $I_{P2}$, as well as substantially equal background current levels $I_{B1}$ and $I_{B2}$ in the two waveforms. However, other embodiments may provide different waveform values, wherein $I_{P1}$ need not equal $I_{P2}$ and/or where $I_{B1}$ and $I_{B2}$ may be unequal, for instance, where different electrode diameters are used in the machines 20a and 20b, and/or where different first and second weld sizes are desired.

In certain embodiments, the power sources 24 are provided with synchronization information, such as heartbeat signals, messages, etc., from the synchronizing controller 40 (FIG. 1), with the waveform generators of the power sources 24 operating to create the first and second welding currents $I_1$ and $I_2$ at the controllable waveform phase angle $\Phi$. In this fashion, with the waveform phase angle $\Phi$ at about zero in FIG. 7A, the pulse current levels $I_{P1}$ and $I_{P2}$ of the first and second currents $I_1$ and $I_2$ are substantially aligned in time, and the currents are at the background levels $I_{B1}$ and $I_{B2}$ substantially concurrently. In this manner, the penetration of the resulting fillet welds W1 and W2 can be controlled to achieve generally symmetrical penetration for welds of the same size, as well as consistent weld penetration values along the length of the welds.

Figure 14B:
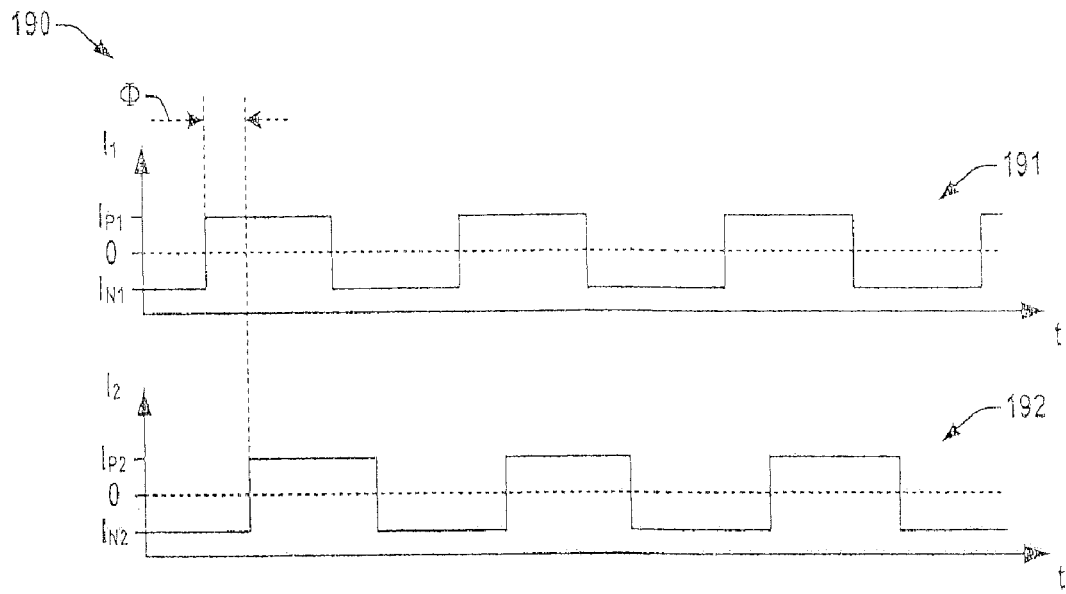
FIG. 14B is a graph showing exemplary AC welding current waveforms with a controlled non-zero degree waveform phase angle.
Figure 14C:
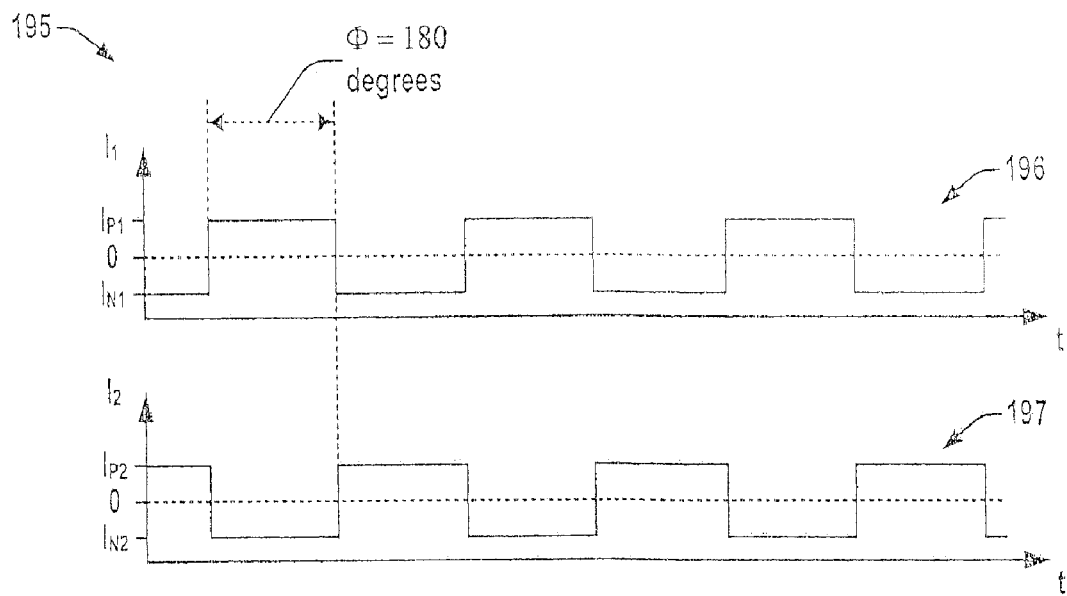
FIG. 14C is a graph showing exemplary plots of synchronized AC pulse current waveforms in the system of FIGS. 1A and 1B for substantially out-of-phase welding waveforms with about 180 degree waveform phase angle.

In other embodiments where the weld sizes are desired to be different (e.g., using different first and second pulse levels $I_{P1}$ and $I_{P2}$ and/or different background levels $I_{B1}$ and $I_{B2}$), the temporal synchronization of the first and second waveforms 81 and 82 facilitates consistency of the weld penetration along the weld length, even where the welds W1 and W2 may penetrate by different amounts. In another possible embodiment, the pulse and/or background levels may be different for the first and second welding waveforms 81 and 82, where the electrodes E1 and E2 are not the same, such as different diameter wires, different materials, etc., where the desired weld sizes, profiles, etc., may be the same, and where the wire feed speeds may, but need not, be equal. The synchronization of the welding waveforms 81 and 82 in these implementations may also advantageously facilitate control of the weld penetration consistency along the weld length, in addition to enabling substantially symmetrical penetration on the two sides of the stiffener WP1. Thus, the waveform synchronized system 2 may be employed to provide significant advantages in terms of weld consistency, weld strength, and welding costs in a variety of possible dual fillet welding applications through the controlled provision of the first and second welding current waveforms substantially in phase, as exemplified in the plot 80 of FIG. 7A and variants thereof. In addition, it is noted that while the illustrated DC pulse waveforms 81 and 82, and the AC waveforms of FIGS. 14A-14C below, are generally square wave pulse waveforms, other waveform shapes are contemplated, the illustrated embodiments are merely examples.

This aspect of the invention also provides for other controlled waveform phase angle values $\Phi$. FIG. 7B illustrates a graph 84 showing exemplary first and second DC pulse welding current waveforms 85 and 86, respectively, with a controlled non-zero degree waveform phase angle Φ, and FIG. 7C provides a graph 87 illustrating first and second welding current waveform plots 88 and 89 for substantially out-of-phase welding waveforms with about 180 degree waveform phase angle. In the case of FIG. 7C, the magnetic effects of the two pulse welding arcs will be substantially out-of-phase for waveform phase angles Φ of about 180 degrees, such as 175 to 185 degrees, thereby allowing control over the dual fillet weld uniformity, penetration, shape, size, etc. through the controlled waveform synchronization in the system 2.

Referring also to FIGS. 7D-7G, further aspects of the invention involve controlled modulation of work points according to a waveform associated with the welding machines 20*a* and 20*b* in a manner to provide a controlled work point phase angle between the machine work point waveforms. The machine work points can be provided and modulated in one embodiment by the work point allocation system 12 (FIG. 1B), where the work points are provided to the machines 20 in some variable manner to establish a waveform, such as a square wave, sine wave, ramps, or any other waveform shape. In another possible embodiment, the machine work point modulation is controlled by the synchronizing controller 40. Other embodiments are possible, where the work point modulation is provided by cooperative interaction of the work point allocation system 12 and the synchronizing controller 40 or by any other single element of the welding system 2 or combination of system elements, or by an external component operatively connected to the welding system 2, such as components communicatively coupled with the welding system 2 via networks, whether wired or wireless, etc.

Figure 7D:
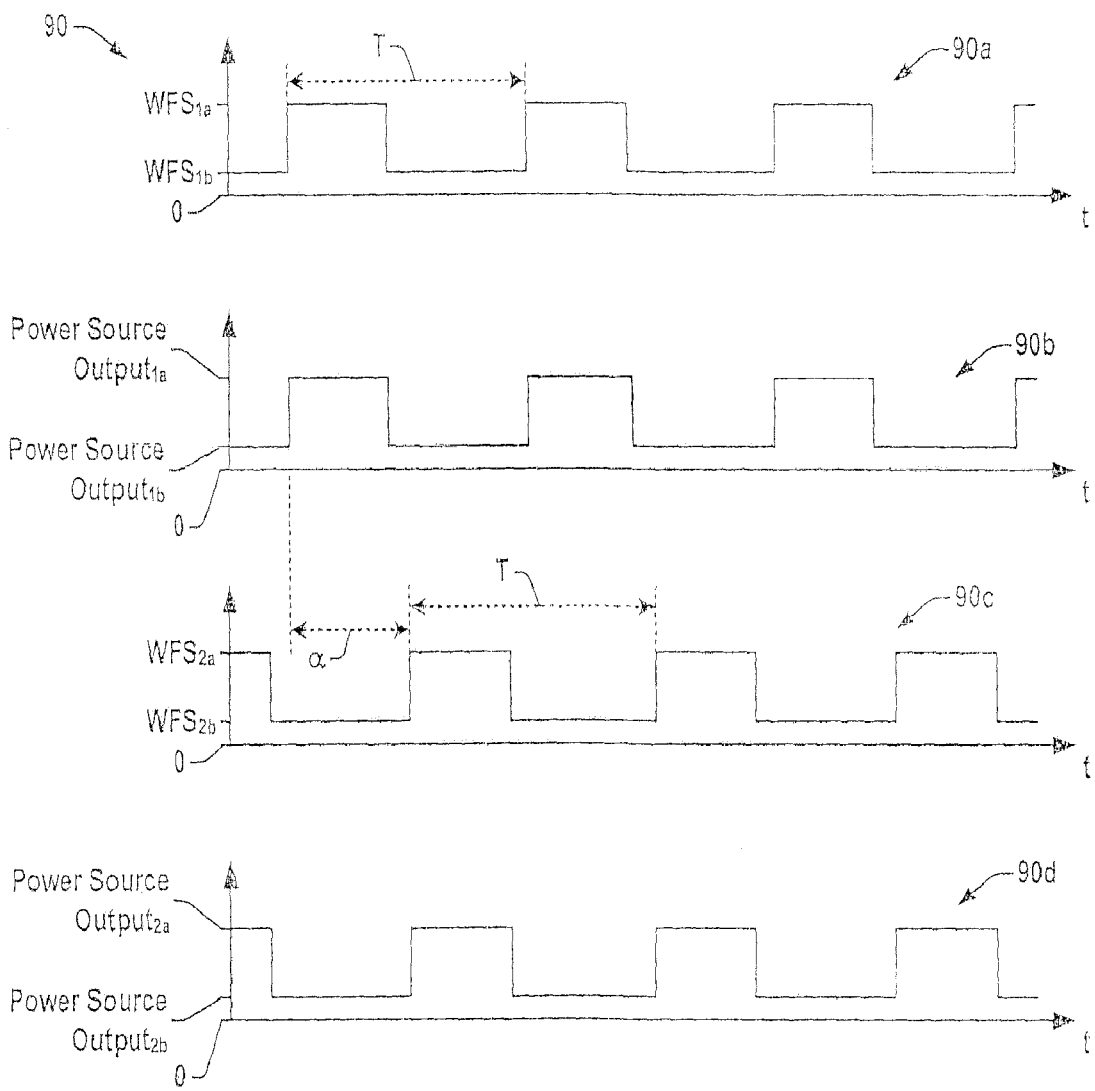
FIG. 7D is a graph showing exemplary plots of synchronized square-wave type welding machine wire feed speed and power source output work point value waveforms in the system of FIGS. 1A and 1B for substantially out-of-phase machine operation at a work point phase angle of about 180 degrees.

One example is shown in FIG. 7D, in which a graph 90 illustrates exemplary plots 90*a*-90*d* of synchronized square-wave type welding machine wire feed speed and power source output work point value waveforms in the system 2 for substantially out-of-phase machine operation at a work point phase angle β of about 180 degrees, such as 175 to 185 degrees. Any suitable relative phase angle β can be used, wherein the invention is not limited to substantially out-of-phase operations as shown in the example of FIG. 7D. As shown in this embodiment, the first machine work point value is provided (e.g., by the work point allocation system 12 in one embodiment) as either a wire feed speed (WFS$_1$) or a power sourced output value (Power Source Output$_1$) from which the first machine 20*a* derives the other. In the illustrated example, the first machine work point value is modulated over time by the work point allocation system 12 in the form of a square wave waveform having a period T with the first wire feed speed value 90*a* alternating between a high value WFS$_{1a}$ and a low value WFS$_{1b}$, wherein the first power source output 90*b* tracks this square waveform with high and low output values Power Source Output$_{1a}$ and Power Source Output$_{1b}$, respectively, aligned with the high and low WFS values WFS$_{1a}$ and WFS$_{1b}$. The work point allocation system 12 also provides a second machine work point to the second welding machine 20*b*, such as a wire feed speed (WFS$_2$) or a power sourced output value (Power Source Output$_2$), where the second wire feed speed machine work point value 90*c* alternates between a high value WFS$_{2a}$ and a low value WFS$_{2b}$, and the second power source output 90*d* tracks this square waveform of the same period T with high and low output values Power Source Output$_{2a}$ and Power Source Output$_{2b}$, respectively. In accordance with certain aspects of the present invention, moreover, the first and second machine work point values are modulated according to first and second machine work point waveforms to provide a controlled machine work point phase angle β between the first and second machine work point waveforms, which can be any value, such as about 180 degrees for substantially out-of-phase operation of the opposing welding operations in the illustrated example.

By controlling the work point phase angle β, the allocation system 12 can control the size, uniformity, consistency, etc. of the resulting dual fillet weld while achieving an overall desired system output. In this regard, the work point allocation system 12 (FIG. 1B) receives a user selected system work point value and provides the modulated first and second machine work point values to the welding machines 20, respectively, based on the system work point value to set a total output of the multiple arc welding system 2 to the system work point value, wherein the system work point value can be any suitable value, parameter, measure, etc. associated with the system 2 or the dual fillet welding process, including but not limited to a system deposition rate, a weld size, a wire feed speed, a welding current, a welding voltage, a travel speed, etc. in implementing the desired system-wide performance according to the user selected system work point, the work point allocation system 12 provides any suitable form of machine work points to the machines 20, including but not limited to a power source output value, a waveform frequency, and a wire feed speed. In practice, moreover, the work point value modulation waveforms may be modulated at any suitable period T and corresponding frequency, such as about 0.1 to about 10 Hz in one example, whereas the power source current output waveforms are generally of a much higher frequency, such as about 60-300 Hz for pulse welding and about 20-90 Hz for AC welding, although these frequency values are merely examples and do not represent limitations to or requirements of the invention. In addition, it is noted that where the machines 20 are themselves synergic, the work point allocation system 12 (or other system element) may provide a single machine work point to each machine 20 (from which the machine 20 will derive two or more work points such as power source output value, a waveform frequency, and a wire feed speed, etc. Alternatively, the work point allocation system 12 may provide more than one machine work point to one or both of the machines 20 or components thereof (e.g., a WFS work point to a wire feeder 26 and a power source output value and/or frequency to the power source 24), wherein the provided machine work point values may be advantageously modulated according to various aspects of the invention.

Figure 7E:
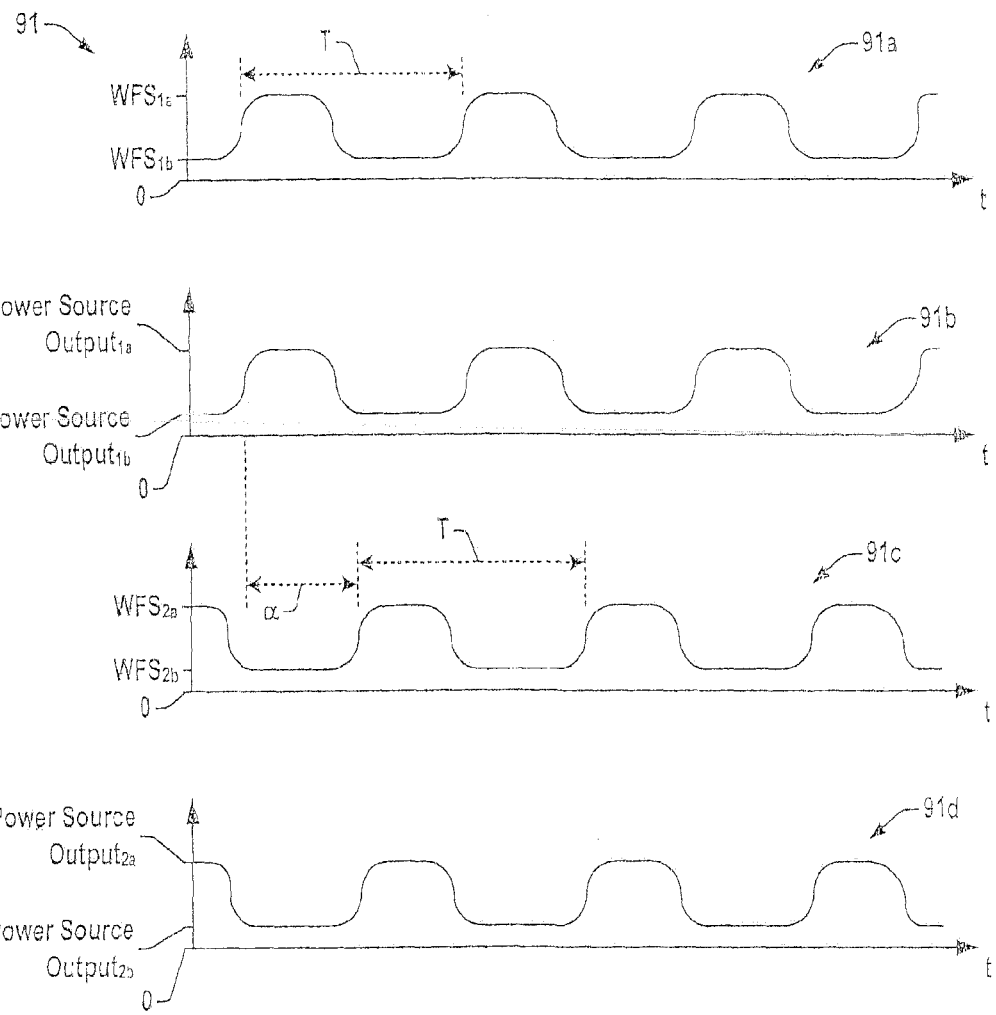
FIG. 7E is a graph showing exemplary plots of synchronized rounded wire feed speed and power source output work point value waveforms in the system of FIGS. 1A and 1B at a work point phase angle of about 180 degrees.
Figure 7F:
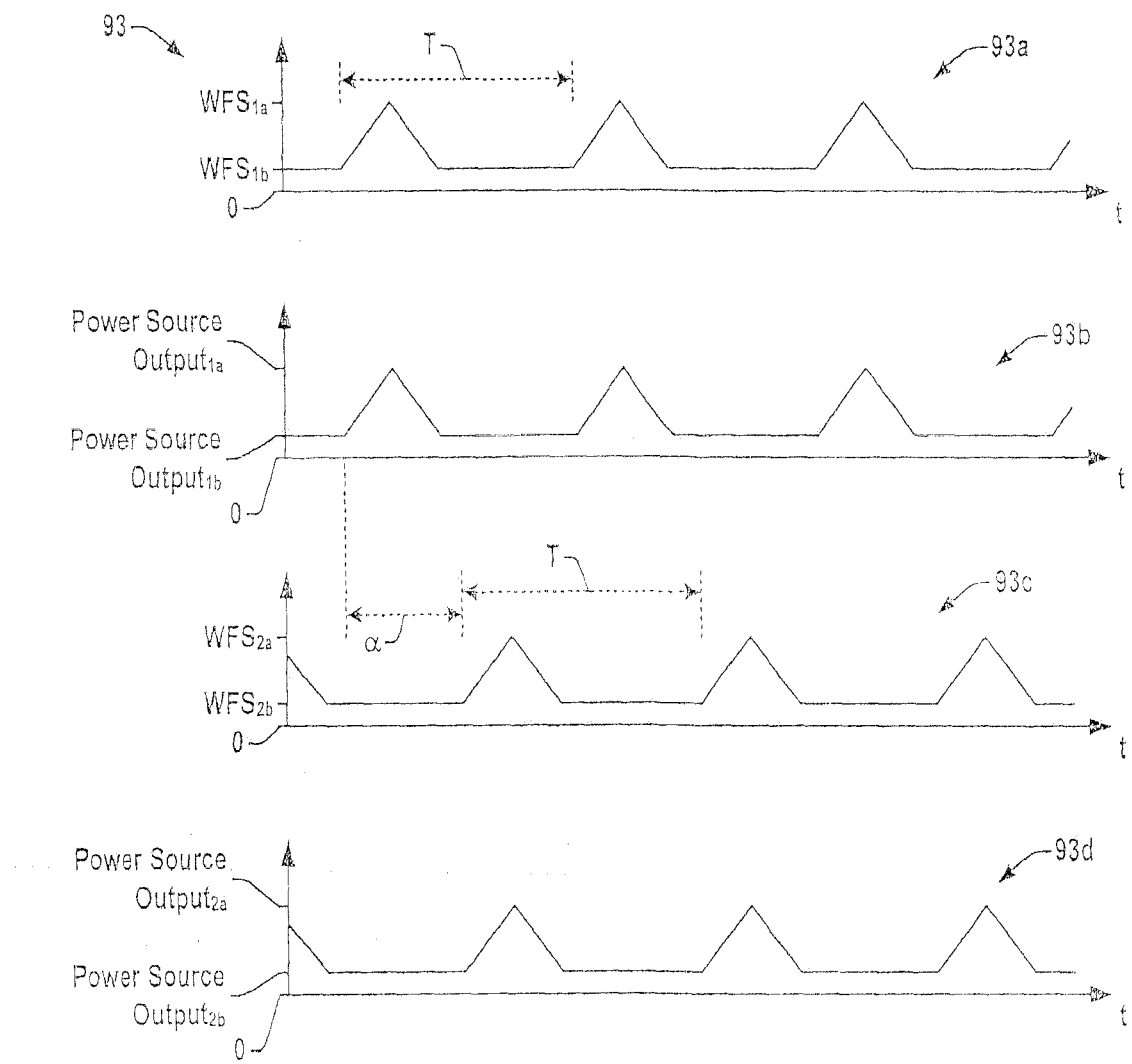
FIG. 7F is a graph showing exemplary plots of synchronized ramped wire feed speed and power source output work point value waveforms in the system of FIGS. 1A and 1B at a work point phase angle of about 180 degrees.
Figure 7G:
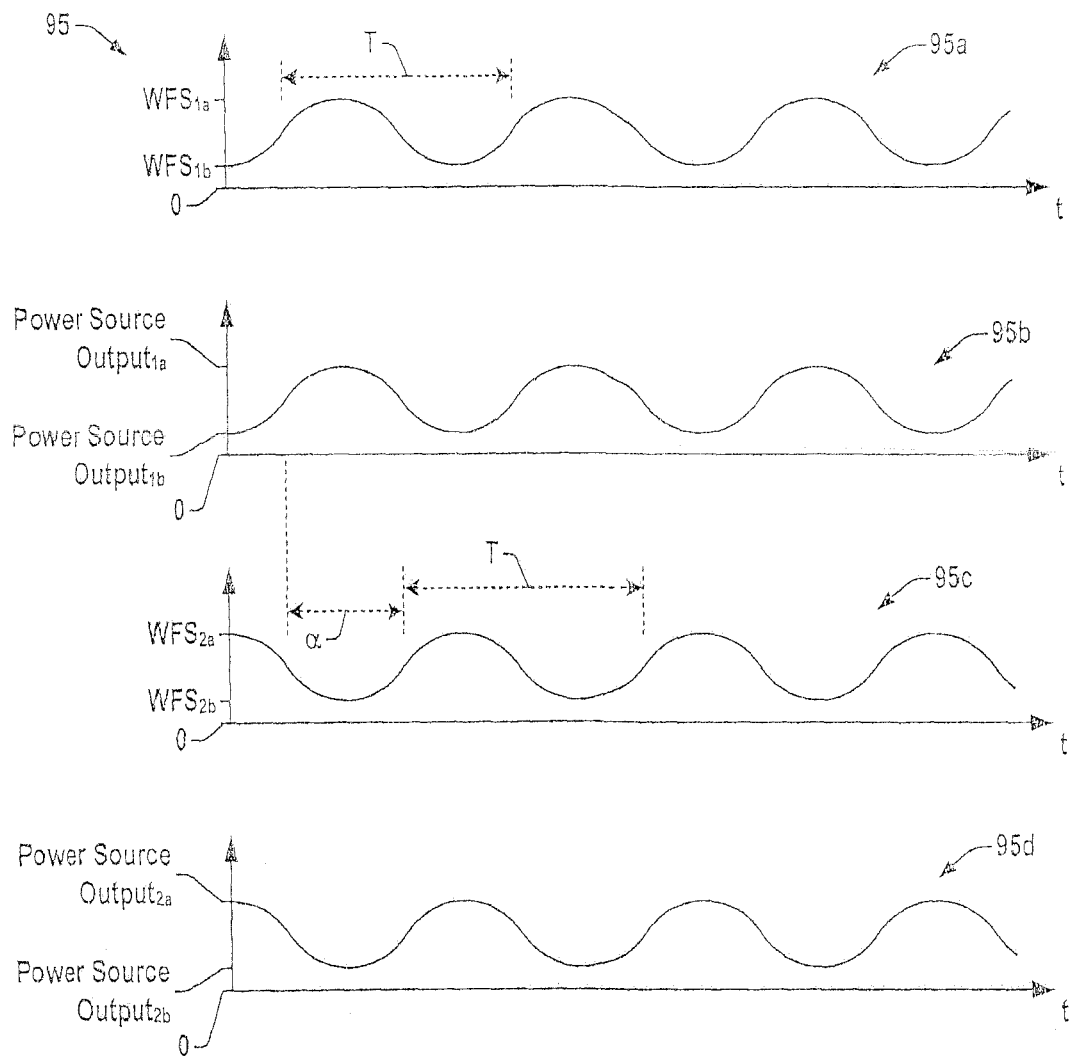
FIG. 7G is a graph showing exemplary plots of synchronized sinusoidal wire feed speed and power source output work point value waveforms in the system of FIGS. 1A and 1B at a work point phase angle of about 180 degrees.

FIG. 7E illustrates another possible work point modulation waveform wherein a graph 91 shows synchronized rounded wire feed speed and power source output work point value waveform plots 91*a*-91*d* in the system 2, again at an exemplary work point phase angle β of about 180 degrees. In this case, the first and second wire feed speed work point values 91*a* and 91*c* provide a smoother transition between the high and low values, thereby allowing for mechanical time constants associate with wire feed mechanisms, wherein the power source output work point waveforms 91*b* and 91*d* also provide for rounded waveform transitions in concert with the corresponding wire feed speeds. FIG. 7F shows a graph 93 with synchronized ramped wire feed speed and power source output work point value waveform plots 93*a*-93*d* also illustrated at a work point phase angle β of about 180 degrees with all the waveforms operating at an exemplary period T. As another example, the graph 95 of FIG. 7G illustrates synchronized sinusoidal wire feed speed and power source output work point value waveforms 95*a*-95*d* in the system 2, where the waveforms 95 are each at a period T and the waveforms of the first machine 20*a* are offset from those of the second machine 20*b* by a work point phase β, again about 180 in this example.

FIG. 8 illustrates another embodiment of the dual fillet welding system 2, wherein the system includes a travel controller component 50 operatively coupled with the welding system controller 10, along with a travel mechanism 52, such as a robot or other mechanical actuation system, to controllably translate a fixture 30 to guide the welding electrodes E1 and E2 along the welding direction 60 to perform the dual fillet welding process forming the welds W1 and W2 concurrently. The travel mechanism 52 can be any system that controls the spatial relationship between the work pieces WP1 and WP2 and the electrodes E1 and E2 to implement a dual fillet welding operation, and the associated travel controller 50 may be hardware, software, etc., whether separate or integrated or distributed within one or more system components, which controls operation of the travel mechanism 52. In this regard, FIG. 8A shows an alternate configuration with the travel mechanism 52 operative to translate the work pieces WP1 and WP2 on a movable carriage or fixture 30*a* in the direction 60 relative to a fixed fixture 30 and stationary welding torches.

As best shown in FIGS. 1B and 8, the exemplary system controller 10 includes the synchronizing controller 40 and the work point allocation system 12, where the system controller 10 may be a stand alone component within the overall dual fillet welding system 2, or one or more components of the controller 10 may be integrated within or distributed among one or more of the welding machines 20 or other system components. In one possible implementation, the welding machines 20*a* and 20*b* may each include system controller components 10, for example, within the power sources 24 thereof, with one machine 20 being designated (e.g., programmed or configured) to operate as a master and the other configured to operate as a slave. In this type of embodiment, the master machine 20 is operatively coupled with the slave machine 20 to provide the system control functions as set forth herein. In this regard, the system controller 10, as well as the work point allocation system 12 and synchronizing controller 40 thereof may be implemented in any suitable form, including hardware, software, firmware, programmable logic, etc., and the functions thereof may be implemented in a single system component or may be distributed across two or more components of the welding system 2. The work point allocation system 12 is operatively coupled with the first and second welding machines 20, and receives a user selected system work point value 14, for example, a setting of a user accessible knob 18 or a signal or message from another input device or from a source external to the system 2, wherein the work point allocation system 12 provides first and second welding machine work point values to the machines 20*a* and 20*b*, respectively, based on the system work point value 14. Moreover, the work point allocation system 12 can be configured to modulate the provided machine work point values according to corresponding waveforms to provide the controlled work point waveform phase angle relationship for improved control of the dual fillet welding operation. Whether modulated or not, the work point allocation system 12 provides the machine work point values so as to effectively set a total output of the dual fillet welding system 2 in accordance with the system work point 14. In this manner, the system 12 allows a user to make a single synergic adjustment from which the various operational parameters of the components in the welding system 2 are configured.

The system controller 10 may provide other control functions in the welding system 2, such as data acquisition, monitoring, etc., in addition to the work point allocation and synchronization functions, and may provide various interface apparatus for interaction with a user (e.g., a user interface with one or more value adjustment apparatus such as knobs 18, switches, etc., and information rendering devices, such as graphical or numeric displays, audible enunciators, etc.), and or for direct or indirect interconnection to or with other devices in a distributed system, including but not limited to operative connection for communications and/or signal or value exchange with the machines 20 or other welding equipment forming a part of the system 2, and/or with external devices, such as through network connections, etc., whether for exchanging signals and/or communications messaging, including wire based and wireless operative couplings. As best shown in FIG. 8, system controller 10 receives a user selected system work point value 14, which may be obtained by a user adjusting one or more knobs 18 on a faceplate interface of system controller 10, or which may be obtained from another device, for example, from a hierarchical controller or user interface coupled with system 2 through a network or other communicative means, whether wired, wireless, or other form (not shown). The system controller 10 may also store and/or be operative to receive user selected process information 16, for example, process type information, welding electrode size information, process recipes or procedures, etc.

The work point allocation system 12 derives welding machine work point values (e.g., wire feed speed values WFS1 and WFS2 in FIG. 8) for the individual welding machines 20 based on the system work point value 14, wherein the derivation of the machine work points may, but need not, take into account user selected information 16 regarding a specific desired or selected welding process or operation. The user selected process information 16 may specify, for example, whether a given process is to be a dual fillet DC pulse process using flux cored electrodes E, as exemplified in FIGS. 1, 2B, and 3-7C above, or an AC solid wire dual fillet submerged arc process as shown in FIGS. 10-14C below. The work point allocation functions may be implemented in any suitable fashion, including but not limited to lookup tables to map user selected system work point values 14 to machine work point values, taking into account welding process type and wire diameter and/or other process parameters (e.g., information 16), as well as algorithmic or equation based computation of the machine work points based on the user selected system work point value 14. In the implementation depicted in FIG. 8, for example, the work point allocation system 12 receives the system work point 14, such as a deposition rate, a weld size, a wire feed speed, a welding current, a welding voltage, a travel speed, etc., and derives two or more machine work point values, such as wire feed speeds, deposition rates, welding currents, welding voltages, travel speed setting for the travel controller 50, etc. according to a single system work point value 14. In this manner, the synergic work point allocation system 12 divides or apportions the system setting 14 into the welding machine work point values for the individual machines 20, wherein the system work point value 14 and the derived machine work point values may, but need not, be of the same type. For example, the user selected value 14 may be a total system deposition rate expressed in units of pounds per hour, with the machine work points being wire feed speeds or other values. In this regard, the allocation system 12 in one embodiment may provide approximately equal first and second wire feed speed machine work point values WFS1 and WFS2 to the machines 20*a* and 20*b*, respectively, in applications in which symmetrical welds W1 and W2 of equal sizes are desired. The machines 20 or components thereof (e.g., power sources 24) may derive further component settings from a single machine work point value, such as the power source 24 receiving a machine wire feed speed and deriving welding signal parameters therefrom (e.g., voltage, current, pulse widths, duty cycles, etc), in localized synergic fashion, or the allocation system 12 may provide multiple work points to each machine 20. Moreover, the work point allocation system 12 in the illustrated embodiment of FIG. 8 also derives at least one travel control value (e.g., travel speed) based on the system work point value 14 and provides the travel control value to the travel controller 50.

Figure 9:
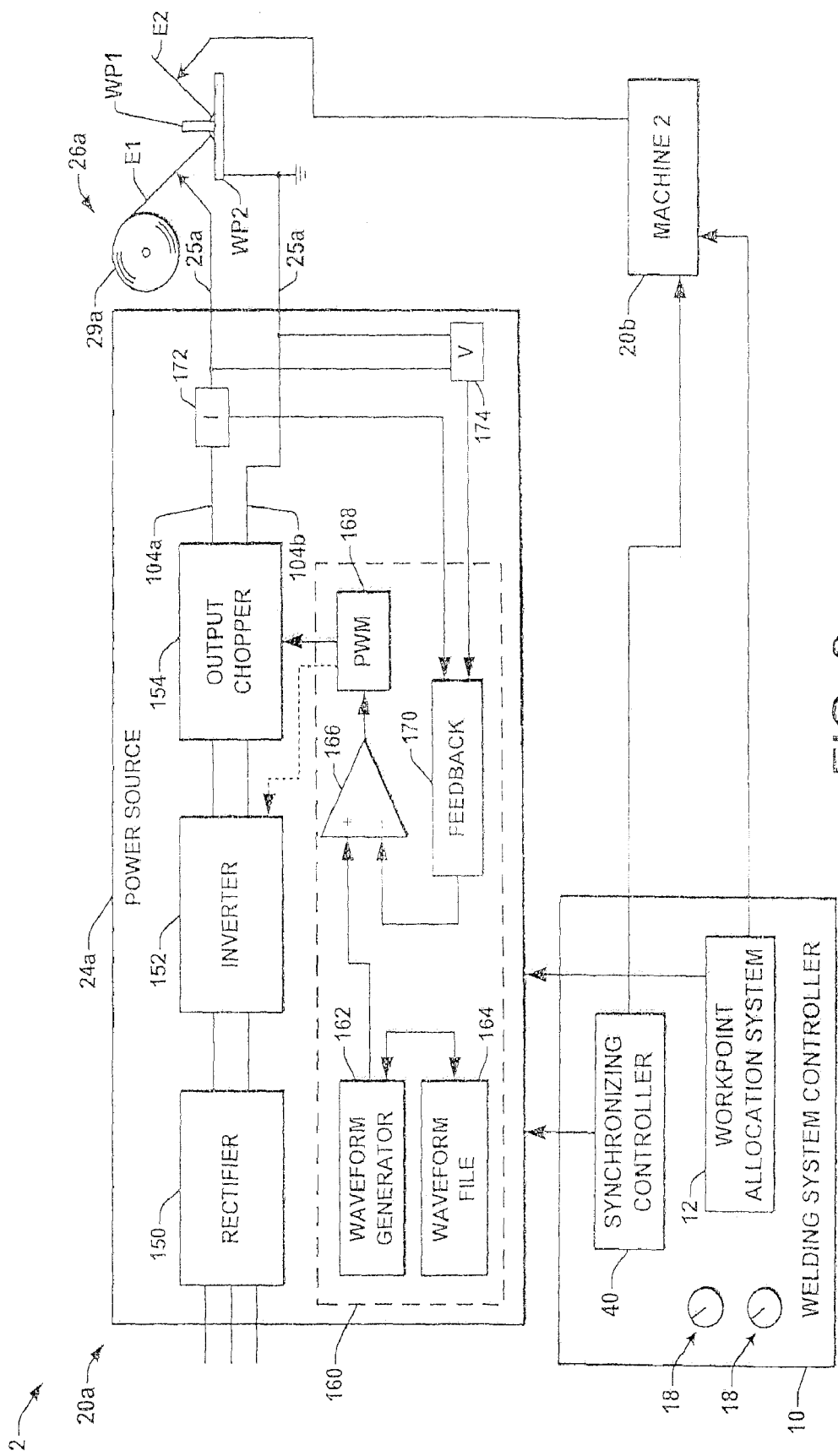
FIG. 9 is a simplified schematic diagram illustrating further details of one of the exemplary switching type welding power sources providing a welding current according to a pulse width modulated switching signal from a programmable waveform generation system.

Referring also to FIG. 9, further details of the exemplary waveform controlled first power source 24a are illustrated, wherein the second power source 24b may be similarly constructed in certain embodiments of the welding system 2. In general, the system 2 may employ any switching type welding power source 24 that provides an electrical welding signal according to one or more switching signals. The exemplary source 24a includes a rectifier 150 that receives single or multiphase AC input power and provides a DC bus output to a switching inverter 152. The inverter 152 drives an output chopper 154, where chopper 154 and inverter 152 are operated according to switching signals from a pulse width modulation (PWM) switching control system 168 to provide a welding output signal at terminals 25a suitable for application to a fillet welding process or operation. In practice, one or both of the output terminals 25a may be coupled through a power source cable to wire feeder 26a for ultimate provision of the welding signal to the welding operation through a torch and cable (not shown), where welding current and voltage sensors 172 and 174 are provided in power source 24 to create feedback signals for closed loop control of the applied welding signal waveform 81. Power source 24a also includes a waveform generation system 160 providing switching signals to the output chopper 154 and optionally to inverter 152, where system 160 includes a waveform generator 162 providing a desired waveform control signal to an input of a comparator 168 according to a selected desired waveform 164, stored as a file in one example. The desired waveform is compared to one or more actual welding process conditions from a feedback component 170 and the comparison is used to control the PWM switching system 168 to thereby regulate the welding signal in accordance with the desired waveform (e.g., welding current signal waveform 81 of FIG. 7).

The waveform generation system 160 in the embodiment of FIG. 9 and the components thereof are preferably implemented as software or firmware components running in a microprocessor based hardware platform, although any suitable programmable hardware, software, firmware, logic, etc., or combinations thereof may be used, by which one or more switching signals are created (with or without feedback) according to a desired waveform or waveform file 164, wherein the switching type power source 24a provides a welding signal according to the switching signal(s). One suitable power source is shown in Blankenship U.S. Pat. No. 5,278,390, wherein the power source 24a can be a state table based switching power source that may receive as inputs, one or more outputs from other system components, such as a sequence controller, the welding system controller 10, etc., wherein waveform generation system components 162, 166, 170 may be implemented as a waveform control program running on, or executed by, a microprocessor (not shown) that defines and regulates the output waveform of power source 24a by providing control signals via PWM system 168 to inverter 152 and/or chopper 154, where the output waveform can be a pulse type of any waveform or shape that can be synchronized for substantially in-phase operation relative to a second power source 24, and may provide for DC or alternative current polarities (AC), as shown in the submerged arc embodiment of FIGS. 10-14 below.

Referring now to FIGS. 10-14D, another possible embodiment of the welding system 2 is illustrated, in which solid wire electrodes E1 and E2 (FIG. 2A above) are employed in a submerged arc dual fillet welding process with synchronized AC pulse welding waveforms that are at a controlled waveform phase angle relationship or synchronized work point value modulation. FIG. 14A shows a plot 180 depicting exemplary first and second AC pulse welding current waveforms 181 and 182, respectively, each comprising a series of pulses including a positive current level $I_P$ and a negative current level $I_N$, with the pulses of the first and second welding currents being substantially in phase with one another at a controlled waveform phase angle β of about 0+/−0.5 degrees. Another example is shown in the graph 190 of FIG. 14B, wherein the first and second current waveforms 191 and 192 are operated at the same frequency, but the waveforms thereof are temporally offset by a non-zero waveform phase angle Φ. Yet another example is shown in the graph 195 of FIG. 14C, in which the power source output current waveforms 196 and 197 are substantially out-of-phase with the relative waveform phase angle Φ being about 180 degrees (e.g., 175-185 degrees in one embodiment). It is appreciated that the various AC current and/or voltage waveforms output by the machine power sources 24 may be of any form or shape and need not be the same, wherein the figures are merely examples and are not requirements or limitations of the invention. As with the above described DC pulse examples, moreover, the phase controlled AC waveforms 181 and 182 can be employed to control the consistency and symmetry of the weld penetration of the opposing welding electrodes E1 and E2 during concurrent dual fillet welding, wherein the illustrated embodiment of FIGS. 10-13 employs the AC waveform control in combination with relatively large diameter solid electrodes E (FIG. 2A) and granular flux F (FIGS. 10 and 11) in a submerged arc welding (SAW) process. The waveforms 181 and 182 each include a series of pulses having positive portions ($I_{P1}$ and $I_{P2}$) and negative portions ($I_{N1}$ and $I_{N2}$), illustrated as currents $I_1$ and $I_2$ in FIGS. 14A-14C, wherein the pulses of the first and second welding currents $I_1$ and $I_2$ are synchronized by the synchronizing controller 40 to provide a controlled or regulated waveform phase angle Φ (e.g., within about +/−0.5 electrical degrees of the target angle value Φ in one embodiment).

In one preferred embodiment, moreover, the first and second waveforms 181 and 182 are substantially identical as shown in the plot 180, although not a requirement of the invention. In addition, the exemplary waveforms 181 and 182 are of approximately 50% duty cycle, although other embodiments are possible using any suitable duty cycle. In addition, while the illustrated waveforms are symmetric about the zero current axis with $I_{P1}$ substantially equal to $I_{N1}$ and with $I_{P2}$ substantially equal to $I_{N2}$, other embodiments are possible using asymmetrical waveforms in this respect. Furthermore, the preferred embodiment of FIGS. 10-14C employ first and second waveforms 181 and 182 that are substantially identical, although this is not a requirement of the invention. As with the above described dual fillet DC pulse welding implementations, moreover, the power sources 24 generate the AC submerged arc welding signal waveforms 181 and 182 in FIGS. 10-14 using synchronization information (e.g., heartbeat signals, messages, etc.) from synchronizing controller 40 (FIGS. 1, 8 and 9) to provide welding currents $I_1$ and $I_2$ in a controlled phase angle relationship with respect to one another to facilitate improved control of the resulting fillet welds W1 and W2. As best shown in FIGS. 10-13, the dual fillet SAW process uses granular flux F (FIGS. 10 and 11) formed into two piles along the sides of the T-joint between the stiffener work piece WP1 and the base work piece WP2, and the energized welding electrodes E1 and E2 (FIG. 2A) are passed through the flux piles F. The current signal waveforms 181 and 182 applied to the electrodes E1 and E2 establish and maintain welding arcs A1 and A2 within the granular flux F, causing the flux F to melt and form slag S (FIGS. 10 and 12) over the molten welds W1 and W2, as best shown in FIG. 11. The AC welding waveform is preferably balanced with respect to the zero voltage axis and preferably of a 50 percent duty cycle, wherein these preferred conditions can contribute to controlled penetration and bead shape, although these conditions are not strict requirements of the invention. The dual fillet welding process may lead to weld material W1 and/or W2 penetrating one or both of the work pieces WP1 and WP2 through partial consumption of work piece material and inclusion thereof into the welds W1, W2, resulting in lateral penetration dimensions 92$a$ and 92$b$ and/or first and second downward penetration depths 94$a$ and 94$b$. As the electrodes E are moved along the weld direction 60 (e.g., via travel mechanism 52 of FIG. 8), the weld material W1, W2 solidifies beneath the slag S, and slag S also solidifies as shown in FIG. 12. The slag S is then removed; leaving the finished fillet welds W1 and W2 as shown in FIG. 13, which are substantially the same in the illustrated embodiment. The invention thus provides dual fillet welding systems and methods for dual fillet welding applications, in which the welding signals are synchronized for controlled phase angle operation to facilitate control over dual fillet welding system performance and finished weld quality.

Figure 10:
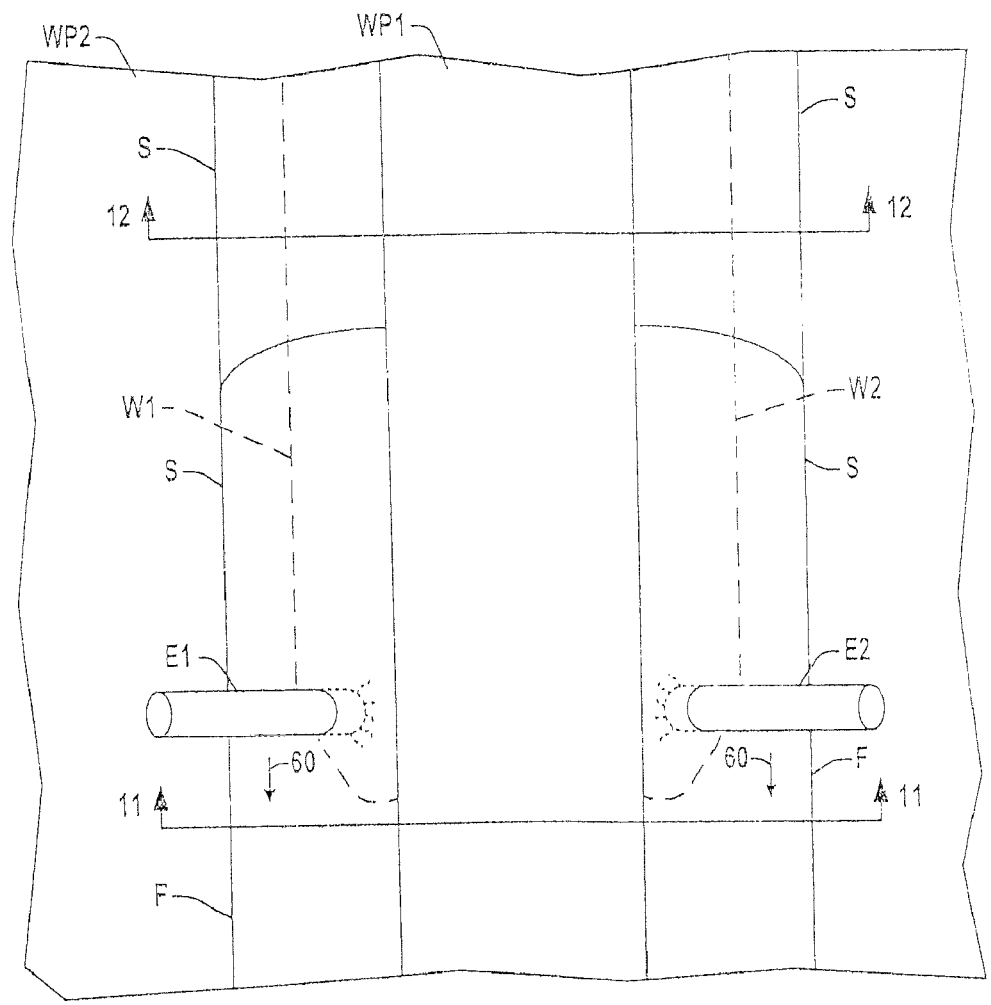
FIG. 10 is a partial top plan view showing an exemplary dual fillet submerged arc welding operation using the system of FIGS. 1A and 1B with synchronized AC welding waveforms.
Figure 11:
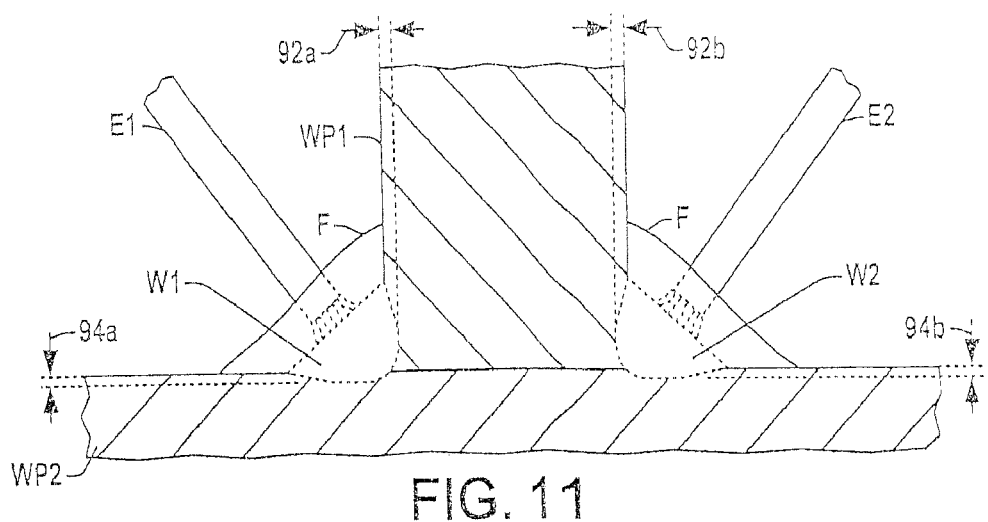
FIG. 11 is a partial end elevation view in section taken along line 11-11 of FIG. 10 illustrating molten weld material and slag being formed within a bed of granular flux during submerged arc dual fillet welding.
Figure 14D:
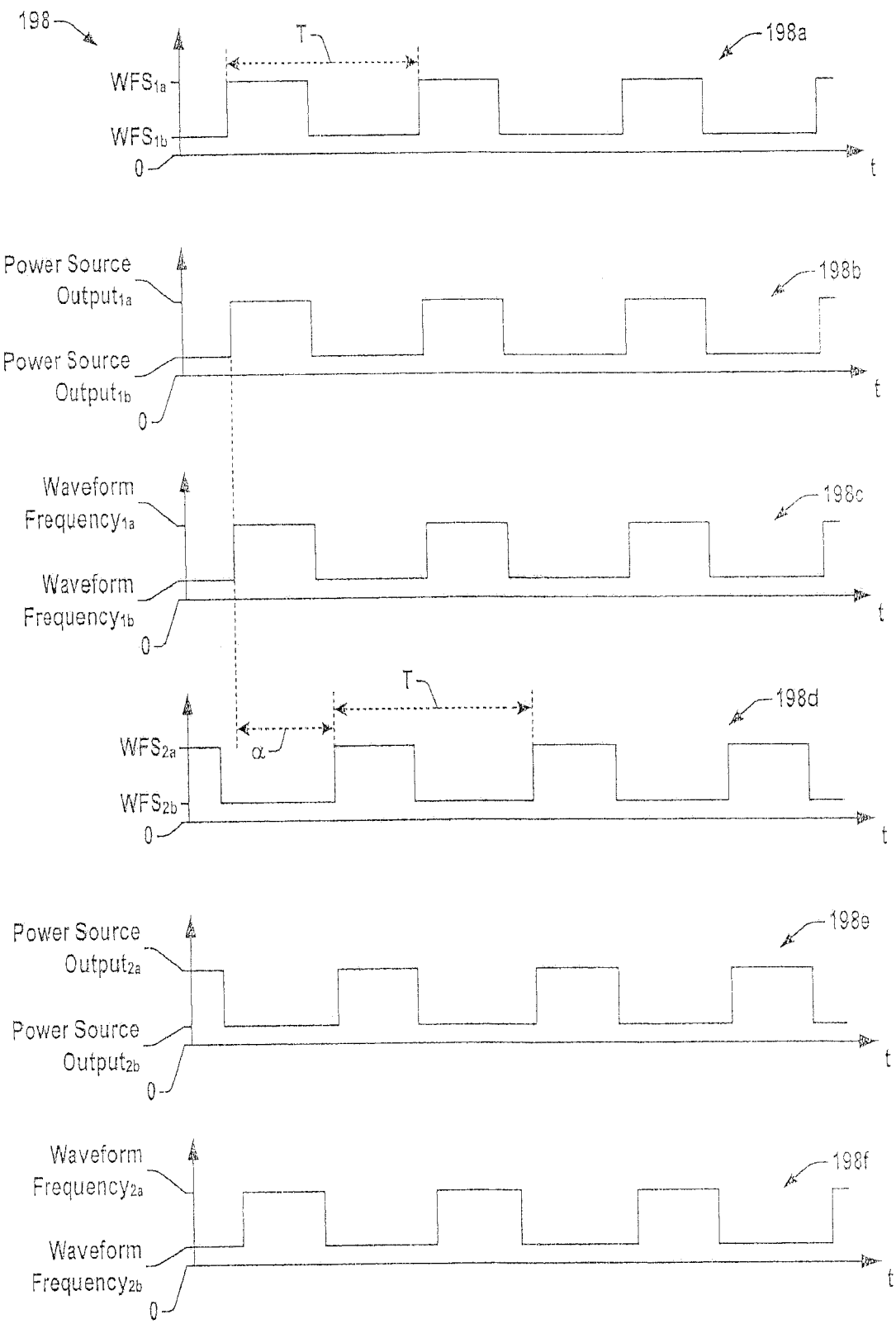
FIG. 14D is a graph showing exemplary plots of synchronized square-wave type welding machine wire feed speed, power source output, and welding frequency work point value waveforms in the system of FIGS. 1A and 1B for substantially out-of-phase machine operation at a work point phase angle of about 180 degrees.

Referring also to FIG. 14D, as discussed above, further aspects of the invention provide for welding machine work point modulation at a controlled phase relationship, which also finds utility in association with AC dual fillet welding applications, such as the submerged arc example of FIGS. 10-12. FIG. 14D provides a graph 198 showing exemplary first and second synchronized square-wave type welding machine wire feed speed waveforms 198$a$ and 198$d$, power source output waveforms 198$b$ and 198$e$, and welding frequency work point value waveforms 198$c$ and 198$f$ in the exemplary dual fillet welding system 2, wherein the work point waveforms 198$a$-198$c$ of the first machine 20$a$ are modulated at a period T at a controlled work point phase angle β relative to the modulated work point waveforms 198$d$-198$f$ of the second machine work points, with all the work point modulation waveforms being operated at a period T. In this example, moreover, the first and second machine work points are modulated in a substantially out-of-phase manner with a work point phase angle β at about 180 degrees, although any suitable controlled phase angle β may be employed. In this example, it is noted that the power source operating frequencies (e.g., the frequencies of the power source output current/voltage waveforms) may also be modulated in the work point modulation technique. In this example, the AC welding waveform frequency is varied in concert with the amplitude, wherein like the above pulse welding examples, the modulation of the work points in AC applications can be according to any suitable modulation waveform shapes, forms, etc., wherein the illustrated square wave work point modulation waveforms 198$a$-198$f$ in FIG. 14D are merely examples. Further, the modulation waveforms of a given machine may be of similar shape, form, etc., as shown, or these may be different. Moreover, the modulated machine work point waveforms may be provided as a group to each machine 20, or the work point allocation system 12 (or other system component) may provide a single modulated work point to a machine 20 with the machine 20 then deriving the remaining work points for the various machine components. In the example of FIG. 14D, moreover, the power source waveform output frequency of each machine is increased when the corresponding wire feed speed and output amplitude is increased and vice versa.

Referring now to FIGS. 15A and 15B, the welding currents and wire feed speeds of the welding machines 20$a$ and 20$b$ may be controlled to provide controlled partial penetration of the T-joint as shown in FIGS. 5 and 6 above, or to provide for essentially complete penetration of the weld joint as seen in FIGS. 15A and 15B, for pulse welding, AC welding, or other dual fillet welding type operations, wherein the waveform synchronization and/or work point synchronization techniques described above can be used to facilitate controlled provision of any desired amount and form of weld penetration for a given dual fillet welding application. FIG. 15A illustrates an exemplary beveled stiffener first work piece WP1$a$ used in forming a dual fillet welded T-joint including beveled lower surfaces 202 and 204 which may be used alone or in combination with one or both of the waveform or work point synchronization aspects of the invention to achieve dual fillet welds having substantially complete penetration to provide an overlap region 20 where the first and second fillet welds W1 and W2 join beneath the first work piece WP1$a$ as shown in FIG. 15B.

Figure 16A:
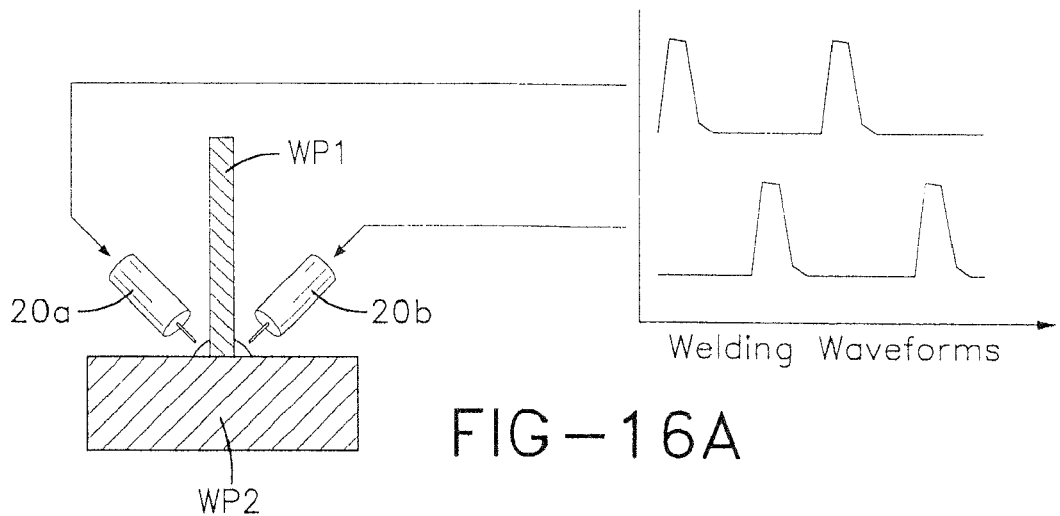
FIG. 16A is a schematic and elevational view of a welding system according to the concepts of the present invention used to form a dual fillet welded T-joint and an exemplary wave form chart depicted therewith.
Figure 16B:
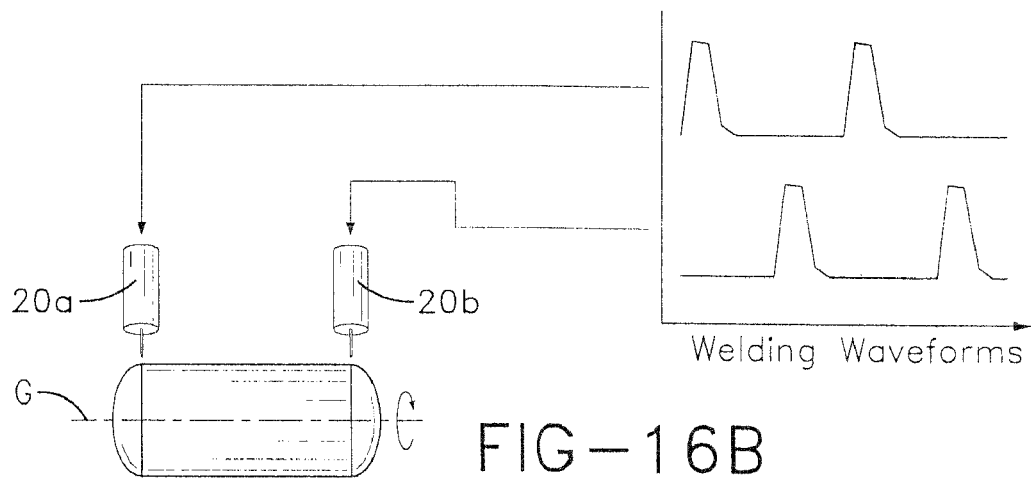
FIG. 16B is a schematic view of a welding system according to the concepts of the present invention shown welding two joints located on a common ground axis in a tank application and a chart showing an exemplary wave form applied to the electrodes.
Figure 16C:
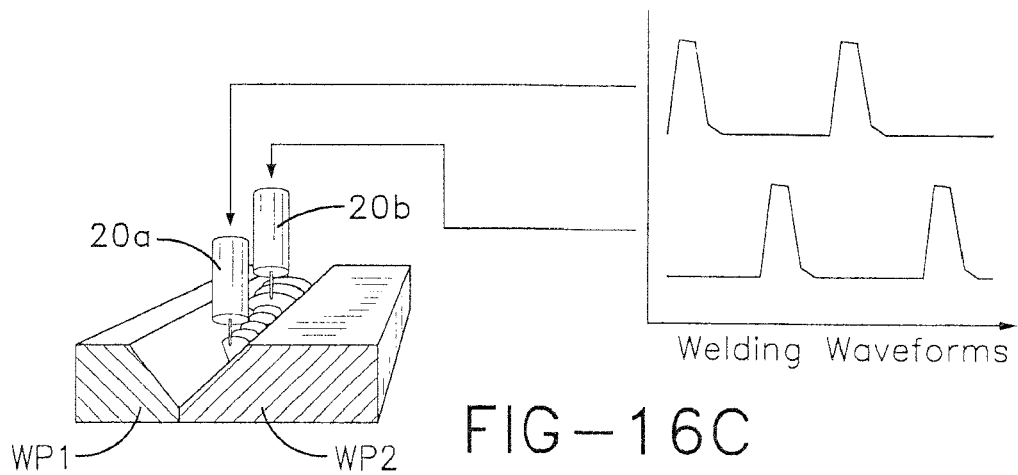
FIG. 16C is a schematic view of a welding system according to the concepts of the present invention used to weld a butt joint by applying a first weld with one electrode followed by an overlying second weld applied with a second electrode where the electrode share a common weld puddle and a chart depicting an exemplary wave form applied to each electrode.
Figure 17:
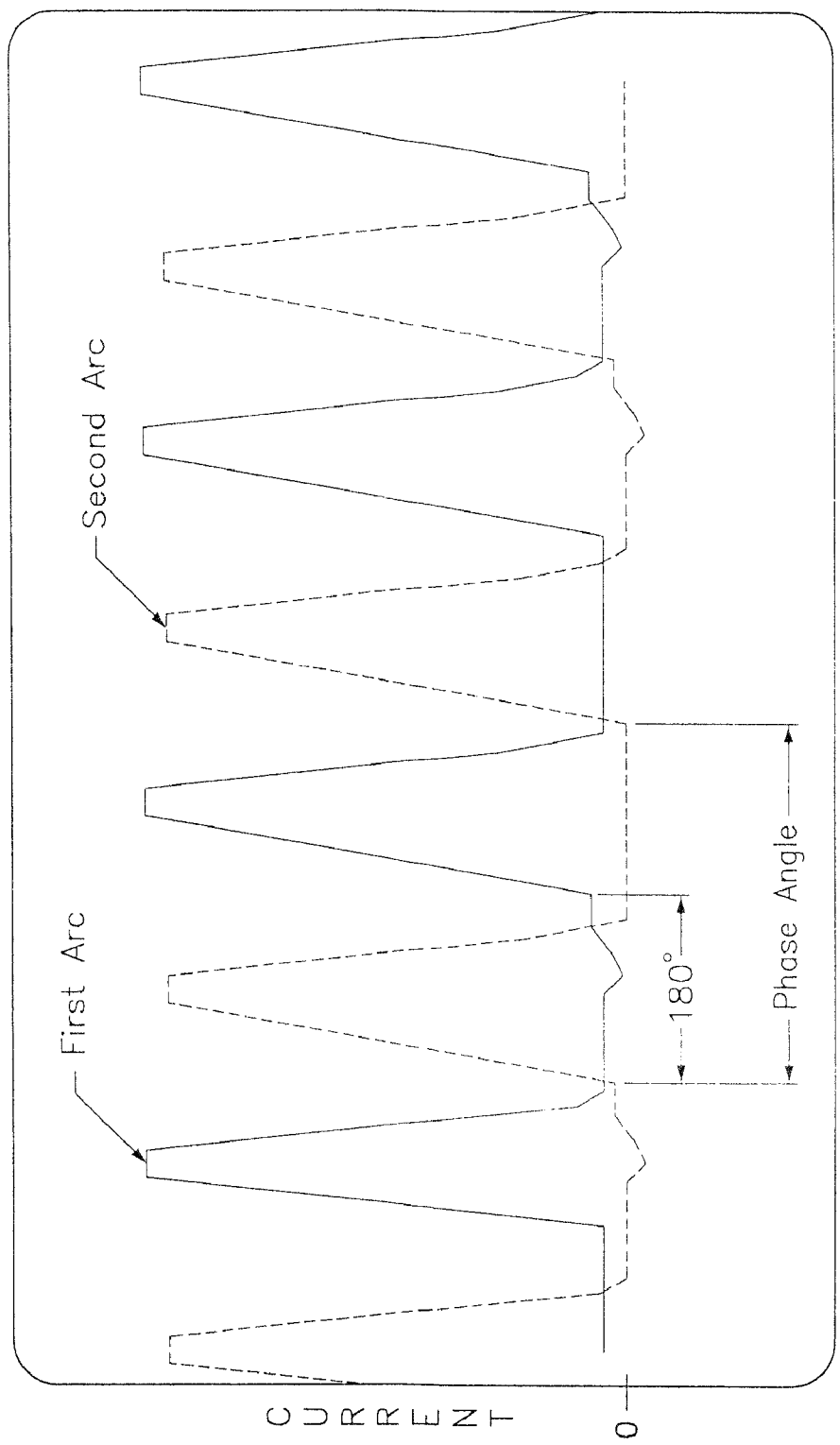
FIG. 17 is a chart depicting an exemplary set of wave forms for a first arc and a second arc where the wave forms are depicted as being separated by a phase angle of 180°.

FIGS. 16A-16C depict alternative embodiments of the present invention in which two or more electrodes E are used to deposit material in applications where interference between the electrodes is expected. For example, FIG. 16A depicts a dual fillet weld with opposing electrodes. As illustrated schematically, in accordance with the concepts of the present invention, wave form synchronization and/or work point synchronization may be used applying the wave forms shown in the accompanying chart out of phase with each other to control the arc onto the electrodes such that they do not interfere with each other. The same synchronization may also be used in an application where the electrodes share a common ground axis such as for example a tank welding application depicted in FIG. 16B. There, while the electrodes operate on separate welds, their shared ground axis is likely to create interference between the electrodes affecting the quality of the weld. As depicted in the accompanying chart, wave form synchronization and/or work point synchronization techniques described above may be used to minimize and/or eliminate the interference between the electrodes. Another application where this type of interference is seen is when both electrodes operate on the same weld puddle or pool. For example, as depicted in FIG. 16C, two electrodes may operate in the same weld puddle when applying layers of electrode material to a butt joint in a successive fashion where a first electrode lays a base layer of material and second electrode follows close behind with a second layer of material above the base layer. Because these electrodes operate in the same puddle, it is common for there to be interference between the electrodes. As depicted in the accompanying chart in FIG. 16C, wave form synchronization and/or work point synchronization techniques described above may be used to minimize and/or eliminate this interference providing more uniform and consistent welds in this type of application. For example, waveforms may be generated such that the first and second arcs are placed 180 degrees out of phase with respect to each other. As depicted in FIG. 17, the waveforms may be such that the current of one arc is approaching zero as the other arc is energized, such that the arcs are effectively applied in an alternating fashion.

Figure 18:
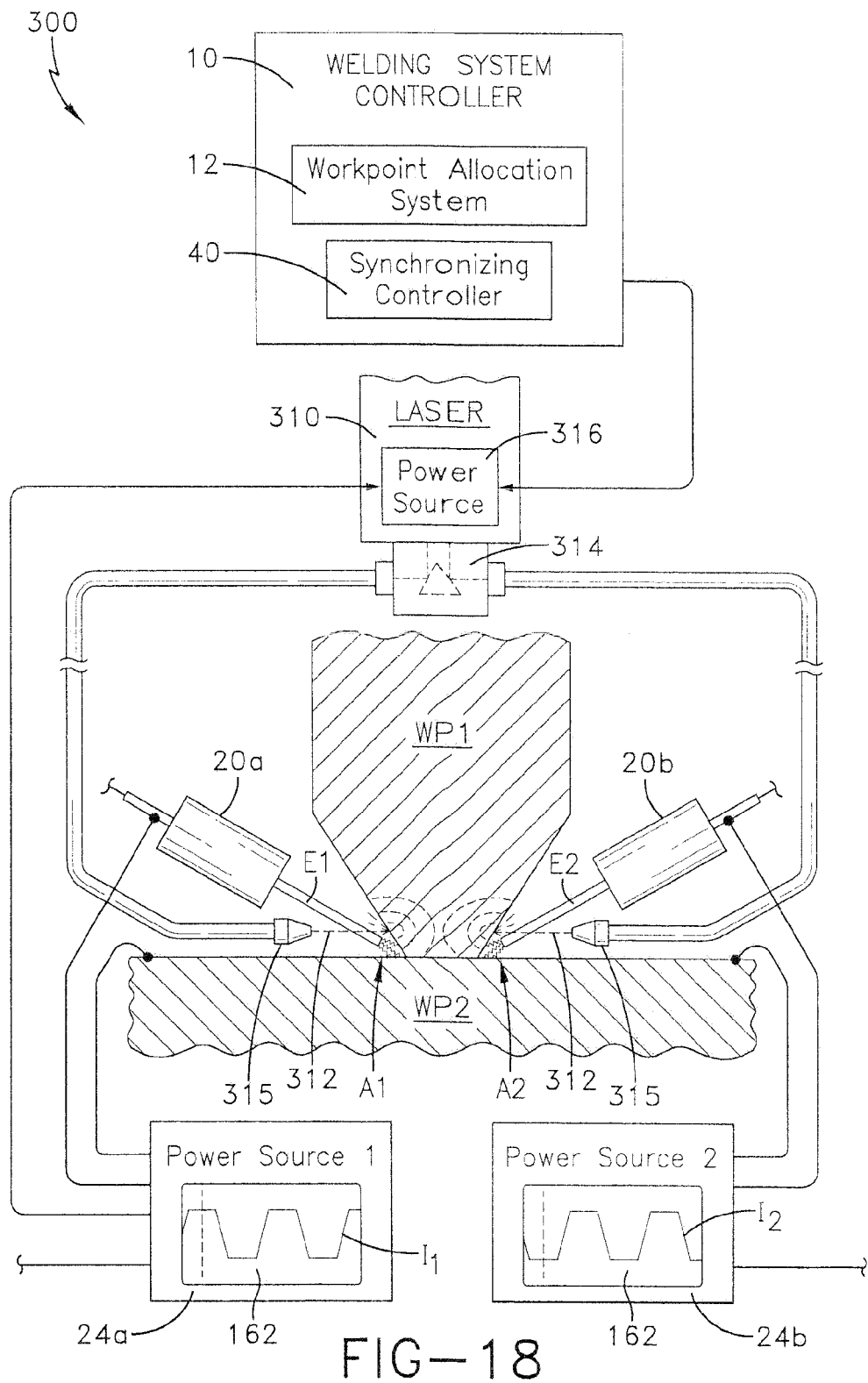
FIG. 18 is a partially sectioned partially schematic end elevational view of a welding system according to the concepts of the present invention depicting a dual fillet weld being applied to a T-joint between a first work piece and a second work piece where a laser is used to direct a beam at a first work piece in conjunction with the operation of electrodes applying fillet welds between the first work piece and second work piece.
Figure 19:
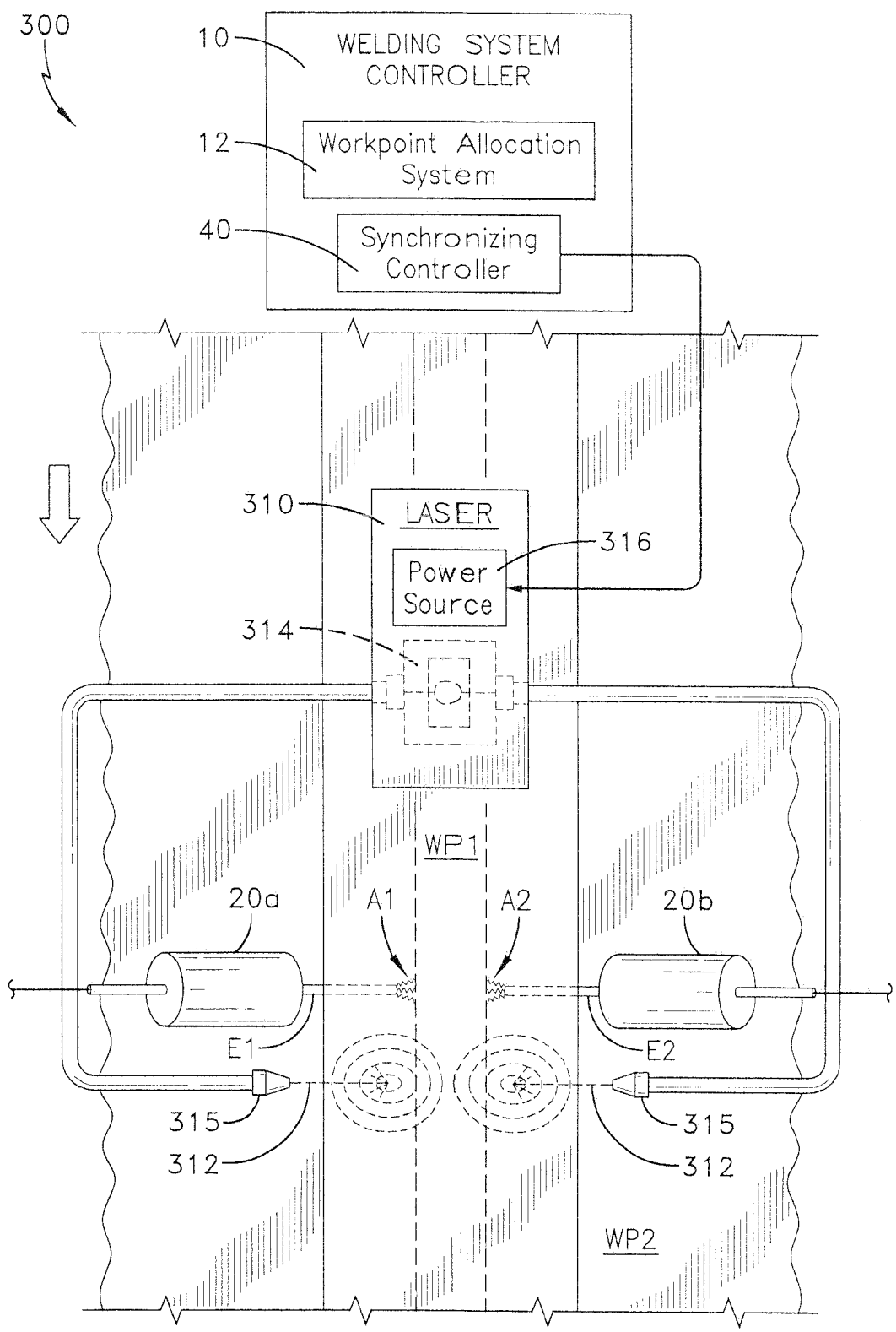
FIG. 19 is a partial top plan view showing an exemplary welding operation using the system of FIG. 18.

Referring now to FIGS. 18-20, an alternative welding system, generally indicated by the number 300 is shown. Welding system 300 generally includes first and second welding machines 20a and 20b with a system controller 10 providing control of the phase relationship between either or both of the welding current wave forms and/or one or more machine work points in creating welds W1 and W2 using electrodes E1 and E2 and welding arcs A1 and A2, respectively to weld a first work piece WP1 to a second work piece WP2 as described in the previous embodiments. Welding system 300 further includes a high energy heat source adapted to apply localized intense heat, such as a laser, generally indicated by the number 310, which is used in conjunction with welding machines 20 to improve penetration of the weld, as described more completely below. Welding system 300 may incorporate welding machines 20 and controller 10 of the previous embodiments and be constructed in a similar fashion with respect to the arc welding components. To that end, details of the previous embodiments arc welding components and controllers including controller 10, synchronizing controller 40 and work point allocation system 12 are incorporated by reference and like numbers will be used to refer to like components in welding system 300. Reference should be made to the previous embodiments for the components that are common to both embodiments to the extent that they are not described in detail herein.

As depicted in FIGS. 18-20, the present embodiment may be used in connection with a dual fillet weld used to join a first work piece WP1 to a second work piece WP2. Welding system 300 may also be used in other applications where interference between arcs is a concern as noted with respect to the previous embodiments. In the dual fillet weld example shown, electrodes E1, E2 are positioned on opposite sides of work piece WP1 in a generally opposing relationship to each other. The electrodes E1, E2 need not be aligned with each other and multiple electrodes may be used on either side of the work piece WP1, as needed. As described in detail in the previous embodiment, electrodes E1 and E2 are electrically connected to a system controller 10. System controller 10 may provide other control functions in welding system 300, such as data acquisition, monitoring, etc., in addition to work point allocation and synchronization functions described in detail in the previous embodiment. In addition, laser 310 may be connected to system controller 10 as described more completely below.

Figure 20A:
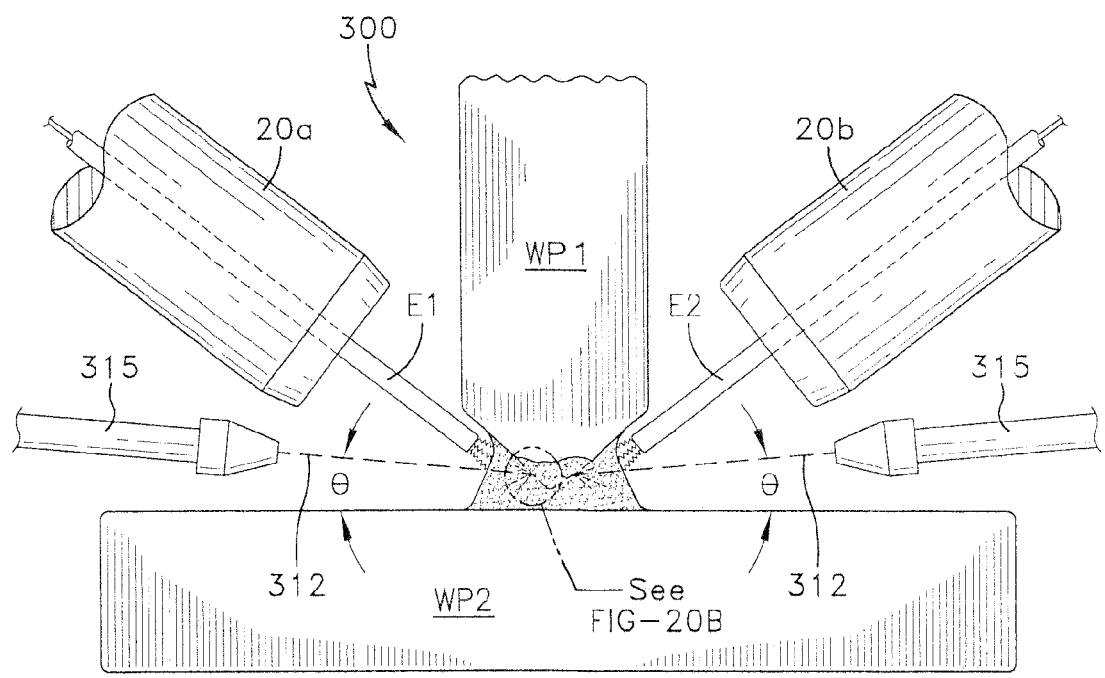
FIG. 20A is a partial end elevational view of the embodiment depicted in FIG. 19 illustrating a laser directing a laser beam at the first work piece and the electrodes depositing fillet material.

According to the concepts of the present embodiment, welding system 300 includes a laser 310 that works in conjunction with the electrodes E1, E2 to form the weld joint. The electrodes E and laser 310 of welding system 300 may be mounted on a welding robot, manipulator or other moving apparatus to perform welding operations. Alternatively, the welding system 300 may be stationary and the work pieces moved relative to the welding system 300, as depicted in FIG. 19. With respect to the relative motion between the work pieces WP and welding system 300, laser 310 may be located upstream of the electrodes E1, E2, and a beam 312 from laser 310 directed at a portion of first work piece WP1 (FIG. 20A). For example, the laser beam 312 may be directed at a corner of first work piece WP1, leading edge of first work piece WP1, or nose of the first work piece WP1 (as shown). In general, laser beam 312 is directed at a surface of either work piece WP1 or WP2 near the interface of the weld joint. Laser 310 may be orientated at a shallow angle allowing a beam 312 from laser 310 to strike first work piece WP1 at an angle θ that is close to horizontal (FIG. 20A). Use of a shallow angle directs the laser's energy more directly at first work piece WP1 in the dual fillet application shown in FIG. 20A. Larger angles may be used to direct energy more toward second work piece WP2 in this same application as desired. Also, the laser 310 may be strobed or oscillated across the joint to encompass a wider area and increase the width of the laser's penetration. This practice may facilitate the welding process by making application of the laser beam more forgiving. The depicted orientations of the laser beams 312 shown are provided as examples. It will be appreciated that other orientations including any angle θ may be used depending on the application and desired area to which the laser energy is to be applied. In the embodiment depicted in FIG. 20A, an angle θ between 0 degrees and about 5 degrees from horizontal is used.

Figure 20B:
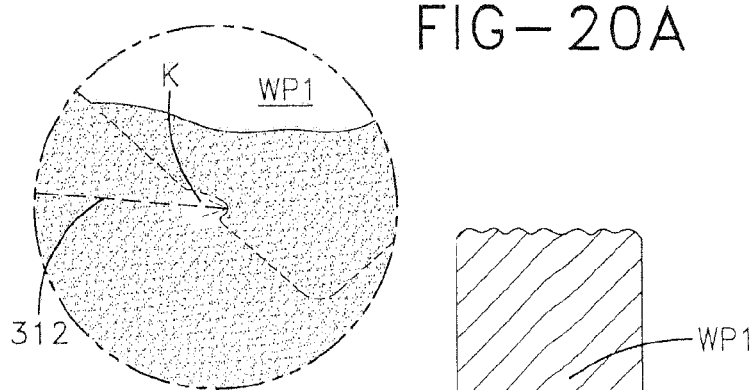
FIG. 20B is an enlarged end elevational view depicting the area indicated in FIG. 20A illustrating formation of a key hole by the laser.
Figure 20C:
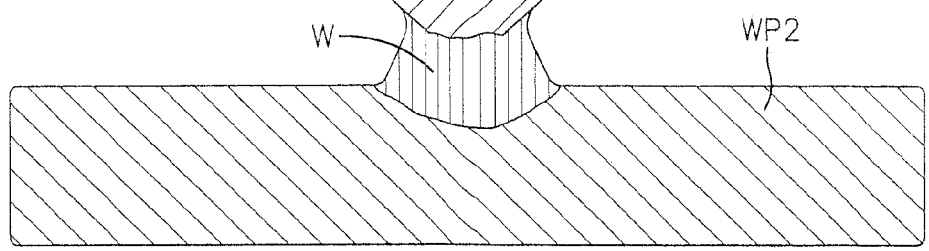
FIG. 20C is a partial end elevational view similar to FIG. 20A illustrating a cooled weld with full penetration.

Laser 310 may provide a beam 312 during the entire welding process or selected portions of the welding process to apply heat to the work piece WP1 causing a portion of first work piece WP1 to melt or vaporize. Melting/vaporizing a portion of first work piece WP1 facilitates the flow of weld material between work pieces WP1 and WP2 allowing full penetration of the weld. To further aid the penetration of the weld, laser 310 may form a keyhole K, which is schematically shown in FIG. 20B, by vaporizing the work piece material initially struck by the laser 310. This void allows weld material from electrodes E1, E2 to flow into keyhole K and intermingle with molten work piece material created by laser 310 to facilitate complete penetration of the weld (FIG. 20C).

Electrodes E1 and E2 are controlled in accordance with the previous embodiments to perform arc welding at or near the same time as the laser input to the first work piece WP1. As described in the previous embodiments, the electrodes E1 and E2 are phased relative to each other to apply arcs A1, A2 to the work piece WP1 in an alternating fashion (FIG. 17). In this way, electrode material is applied to the joint in the same fashion as described in the previous embodiments with the improved penetration provided by application of laser energy to one or more of the work pieces.

While laser 310 is shown in an upstream position relative to the electrodes E1, E2, laser 310 may be located anywhere relative to electrodes E1, E2 to achieve the same effect. For example, as shown in FIG. 19, laser 310 may be aligned with electrodes E1, E2 or located upstream or down stream of electrodes E1, E2. It will be appreciated that when the laser is applied from an aligned position or a downstream position, it has the ability to apply heat to the weld material produced by one or more of the electrodes E and the work piece WP to the same effect as when the laser is applied only to the work piece before application of weld material by electrodes E. In general, laser 310 directs a beam 312 at a portion of a work piece near electrodes E1, E2 to provided localized heating of the work piece WP or weld material through which the laser beam 312 passes to improve the penetration of the weld. It will be appreciated that the laser beam 312 may be directed at or near the point at which the weld material from electrodes E1, E2 is applied.

In accordance with the present invention, one or more lasers 310 may be used. A single laser may be used to apply energy to a single point on the work piece or multiple lasers may be used to apply energy to multiple points on the work piece WP. As shown in FIG. 18, a single laser 310 and beam splitter 314 may be used to apply energy from laser 310 at opposing points on first work piece WP1. Fiber optic lumens 315 or other optical delivery devices such as mirrors etc., may be used to direct the laser beam 312 at a work piece WP or weld.

In the example of FIGS. 18-20, welding machines 20 and laser 310 are operatively coupled with synchronizing controller 40 and a work piece allocation system 12 of system controller 10 for exchanging data and control signals, messages, etc. therewith. In one embodiment, a stand-alone welding system controller 10 includes synchronizing controller 40 operatively coupled with power sources 24a and 24b of welding machines 20 and power source 316 of laser 310. Controller 10 provides power sources 24 with synchronization information (e.g., signals, messages, etc.) to synchronize the first and second wave form generators thereof such that the first and second welding currents are at a controlled phase angle with respect to one another. The wire feeders may also be synchronized by or according to suitable information (data, signaling, etc.) from synchronizing controller 40 and/or directly from the respective power sources 24 or other intermediate components to coordinate the provision of welding wire to the welding process according to the current welding wave forms and other process conditions at a particular point in time. In addition, information from welding machines 20 communicated to welding system controller 10 may be used to control aspects of the laser 310. For example, information regarding the "stick out" may be communicated to the welding system controller 10 and adjustments to the output of the laser 310 made by communicating signals from the welding system controller 10 to the power supply 316 or other component controlling the output of the laser 310. Controller 10 may use stick out feedback from the welding machines 20 to adapt the output of laser 310. For example, longer stick out indicates that the weld puddle is sinking into a larger joint or wider gap. The wider gap requires less energy to obtain full penetration of the weld, thus, controller 10 may reduce the energy applied by laser 310 by reducing the power driving the laser 310 or otherwise adapting the laser output. Likewise, controller 10 may adjust the parameters of the welding machine 20 at the same time resulting in real-time response to the welding conditions by entire system.

Similarly, as discussed in the previous embodiment, the shielding gas supplies may be controlled in synchronized fashion using welding system controller 10 of the machines 20 according to the synchronization information from the synchronizing controller 40. The welding system controller 10 may further include a work point allocation system 12 operatively coupled with welding machines 20a and 20b, which receives a user selected system set point or work point value and provides individual machine work point values to machines 20 to set a total output of welding system 300. This control may be provided to allow a user to set one system work point value, for example, a deposition rate, weld size, wire feed speed, welding current, welding voltage, a travel speed, etc., with the machines 20 and/or components thereof being provided with local work points to achieve the desired system-wide performance. Moreover, the allocation system 12 for the synchronizing controller 40 or other system components may provide for modulation of one or more machine work points according to work point wave forms to provide a controlled machine work point phase angle between the work point wave forms as described in the previous embodiments. Based on the work point allocation, system controller 10 may also vary the power level of laser 310 to facilitate the arc welding process. To that end, system controller 10 may be connected to power supply 316 of laser 310 (FIG. 18) and operable to vary the amount of power provided by the power supply 316 to laser 310 in accordance with preprogrammed instructions or based on feedback from the welding process.

In creating welds, it is desirable that the size and uniformity of the weld, the amount of penetration, and shape are controllable, repeatable, and uniform along the length of the weld to enhance the quality of the resulting joined structure. Operating multiple electrodes in close proximity to each other, in the same weld puddle, or in an application where the electrodes share a common ground axis often leads to interference between the arcs resulting in irregularities in the size, uniformity, penetration, and shape of the weld. In particular, the interference between arcs creates electro-magnetic forces and pressure that skews the deposition of material away from the point of pressure created by the arc. The welding system of the present invention minimizes this interference through the synchronization and work point allocation of the electrodes E1 and E2 as described above. Furthermore, the synchronization of the concurrent local processes may facilitate ability to economize the amount of welding time and material used. The use of the laser 310 further enhances these economies by providing complete penetration of the weld joint and improving the flow of material into the weld joint such that multiple passes may not be necessary to achieve full penetration and filling.

With respect to the welding electrode, providing synchronized waveform controlled welding currents $I_1$ and $I_2$ to the electrodes E1 and E2 creates and maintains welding arcs A1 and A2 between electrodes E1 and E2 in the work pieces WP1 and WP2 or a weld pool/puddle thereon. Welding arcs A1 and A2, in turn, cause deposition of molten electrode material and possible melting of certain amounts of the work piece materials to form a molten weld W, as shown in FIG. 20C, as the electrodes E pass a given location along the weld direction 60 (FIG. 19). As discussed above, laser 310 provides localized heating of one or more of the work pieces WP1 and WP2 melting and/or vaporizing of certain amounts of the work piece material allowing the molten weld material from electrodes E to completely penetrate the joint between work piece WP1 and work piece WP2. By vaporizing a portion of the work piece WP, laser 310 creates a key hole K that improves penetration of the weld joint. The weld materials, i.e., the molten material from the work piece WP and filler material applied by the electrodes E will eventually cool and solidify as best shown in FIG. 20C leaving a finished weld having full penetration.

As shown in FIG. 20C, the finished weld may have certain profiles or shapes, wherein the exposed outer weld surfaces may be concave as shown in the illustrated example, or be generally flat, convex, curvilinear surface shapes, or fillet face contours. The weld sizes may be characterized by vertical leg dimensions as well as bilateral or horizontal leg dimension. A full discussion of these dimensions is provided in the previous embodiment.

As previously discussed, one or more lasers 310 may be used directly or in conjunction with a beam splitter 314 to apply a laser beam 312 to selected portions of the work piece WP or weld material during the welding operation. In the dual fillet joint example shown, application of a laser beam 312 to either side of the first work piece WP1 may facilitate penetration of the weld material applied by electrodes E1 and E2. Synchronized control of the welding current wave forms and/or of welding machine work point values in conjunction with the application of energy from laser 310 may facilitate control over the consistency of the dimensional and performance characteristics of the weld W in dual fillet welding where the two sides of the T-joint are welded concurrently. In addition, providing first and second welding current wave forms at a controlled phase angle in conjunction with the application of laser energy to the work piece WP or weld joint is believed to contribute to the controllability of these dimensions in situations where the first and second welds applied by electrodes E1, E2 are designed to be different. Alternatively, or in combination, controlled modulation of one or more machine work point values such as the power source output levels, wave form frequency, wire feed speed, laser power, etc., may be employed to further improve the controllability of these dimensions and otherwise improve the quality of the resulting weld.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including". "includes", "having", "has", "with", or variants thereof are used in the detailed description and/or in the claims, such terms are intended to be inclusive in a manner similar to the term "comprising".

What is claimed is:

1. A welding system for forming a weld between a first work piece and a second work piece, the welding system comprising:
    a first welding machine comprising:
    a first power source coupled to a first welding electrode, the first power source including a first wave form generator providing a first welding current with a first wave form at an output terminal of the first power source, wherein said first waveform generator generates the first wave form and controls a pulse width modulator circuit of the first power source to determine the current operation of the first power source; and a first wire feeder directing the first welding electrode toward a weld joint at a first wire feed speed;
    a second welding machine comprising:
    a second power source coupled to a second welding electrode, the second power source including a second wave form generator providing a second welding current with a second wave form at an output terminal of the second power source, wherein said second waveform generator generates the second wave form and controls a pulse width modulator circuit of the second power source to determine the current operation of the second power source; and a second wire feeder directing the second welding electrode toward the weld joint at a second wire feed speed;
    a synchronizing controller operatively coupled with the first and second power sources to synchronize the first and second wave form generators to provide a controlled wave form phase angle between the first and second wave forms.

2. The welding system of claim 1 further comprising a high energy source adapted to heat a portion of the work piece near the electrodes to facilitate penetration of a weld material produced by the electrodes.

3. The welding system of claim 2, wherein the high energy heat source is a laser.

4. The welding system of claim 3, wherein said laser is connected to said controller, wherein said controller is adapted to simultaneously control output of the laser and operation of said first and second welding machines.

5. The welding system of claim 4, wherein said controller is adapted to receive a stick out measurement from at least one of said first and second welding machines, and said controller is adapted to adjust a power level of said laser based on said stick out measurement.

6. The welding system of claim 1, wherein the first and second welding machines are operated according to first and second machine work point values, respectively, the system further comprising means for modulating the first and second machine work point values according to first and second machine work point waveforms to provide a controlled machine work point phase angle between the first and second machine work point waveforms.

7. The welding system of claim 6, wherein the means for modulating the first and second machine work point values comprises a work point allocation system operatively coupled with the first and second welding machines, the work point allocation system receiving a user selected system work point value and providing the first and second machine work point values to the first and second welding machines, respectively, based on the system work point value to set a total output of the multiple arc welding system to the system work point value.

8. The welding system of claim 7, wherein the system work point value is one of a deposition rate, a stick out, a weld size, a wire feed speed, a welding current, a welding voltage, and a travel speed.

9. The welding system of claim 6, wherein the machine work point values comprise at least one of a power source output value, a waveform frequency, and a wire feed speed.

10. The welding system of claim 6, wherein the means for modulating the first and second machine work point values is the synchronizing controller.

11. The welding system of claim 1, further comprising a work point allocation system operatively coupled with the first and second welding machines, the work point allocation system receiving a user selected system work point value and providing first and second welding machine work point values to the first and second welding machines, respectively, based on the system work point value to set a total output of the multiple arc welding system to the system work point value.

12. The welding system of claim 11, further comprising a travel mechanism controlling a spatial relationship between the work pieces and the electrodes, and a travel mechanism controller that controls operation of the travel mechanism, wherein the work point allocation system derives at least one travel control value based on the system work point value and provides the travel control value to the travel mechanism controller.

13. A welding system for creating a weld between a first work piece and a second work piece, the welding system comprising:
    a first welding machine comprising:
    a first power source having an output terminal coupled to a first welding electrode, the first power source including a first wave form generator providing a first welding current with a first wave form at the output terminal of the first power source, wherein said first wave form generator generates the first wave form and controls a pulse width modulator circuit of the first power source to determine the current operation of the first power source; and a first wire feeder directing the first welding electrode toward a weld joint at a first wire feed speed;

a second welding machine comprising:

a second power source having an output terminal coupled to a second welding electrode, the second power source including a second wave form generator providing a second welding current with a second wave form at the output terminal of the second power source, wherein said second wave form generator generates the second wave form and controls a pulse width modulator circuit of the second power source to determine the current operation of the second power source; and a second wire feeder directing the second welding electrode toward the weld joint at a second wire feed speed;

a synchronizing controller operatively coupled with the first and second power sources to synchronize the first and second wave form generators to provide a controlled wave form phase angle between the first and second wave forms; and a high energy heat source adapted to heat a portion of at least one of the work pieces near said electrodes.

14. The welding system of claim 13, wherein said high energy heat source is a laser.

15. The welding system of claim 14, where said laser directs the laser beam at an angle between 0° and 5° relative to horizontal.

16. The welding system of claim 14, wherein said laser is adapted to direct the laser beam in at least one of a constant, pulsed, or strobed form.

17. The welding system of claim 14, wherein said a laser has a power source, and wherein said synchronizing controller is coupled to the power source of said laser and adapted to selectively control the power level of said laser according to a work point value.

18. The welding system of claim 17, wherein said work point value includes a stick out measurement.

19. A method for creating a weld between a first work piece and a second work piece, the method comprising:
   directing a first welding electrode toward the first side of the weld joint at a first wire feed speed;
   providing a first welding current with a first waveform to the first welding electrode to create a first welding arc for forming a first fillet weld;
   directing a second welding electrode toward the second side of the weld joint at a second wire feed speed:
   providing a second welding current with a second waveform to the second welding electrode to create a second welding arc for forming a second fillet weld, wherein the second waveform of the second welding current is at a controlled wave form phase angle relative to the first waveform of the first welding current; and
   directing a laser beam toward at least one of said work pieces at a point adjacent to said weld and moving the first and second electrodes along the first and second sides, respectively, to create the weld.

20. The method of claim 19 further comprising the step of forming a keyhole in at least one of the first and second work pieces with said laser.

21. The method of claim 19, further comprising:
   controlling the first wire feed speed and the first waveform according to a first machine work point value;
   controlling the second wire feed speed and the second waveform according to a second machine work point value;
   synchronizing the first and second machine work point values; and
   controlling application of the laser beam according to at least one of the first and second machine work point values.

22. The method of claim 21, wherein said work point values include a stick out.

23. The method of claim 22 wherein said step of controlling includes reducing the power of the laser upon detecting an increase in the stick out.

* * * * *